United States Patent
Cariveau et al.

(10) Patent No.: US 11,015,603 B2
(45) Date of Patent: *May 25, 2021

(54) FIBER-LOADED RUBBER COMPOUND USEFUL IN PDM STATORS

(71) Applicant: Abaco Drilling Technologies, LLC, Houston, TX (US)

(72) Inventors: Peter Thomas Cariveau, Houston, TX (US); Robert Bohmer, Kingwood, TX (US)

(73) Assignee: Abaco Drilling Technologies LLC, Houston, TX (US)

(*) Notice: Subject to any disclaimer, the term of this patent is extended or adjusted under 35 U.S.C. 154(b) by 215 days.

This patent is subject to a terminal disclaimer.

(21) Appl. No.: 16/258,826

(22) Filed: Jan. 28, 2019

(65) Prior Publication Data
US 2019/0195227 A1  Jun. 27, 2019

Related U.S. Application Data

(63) Continuation of application No. 15/292,798, filed on Oct. 13, 2016, now Pat. No. 10,215,176.
(Continued)

(51) Int. Cl.
*F01C 5/00* (2006.01)
*F03C 2/00* (2006.01)
(Continued)

(52) U.S. Cl.
CPC .......... *F04C 29/00* (2013.01); *B29C 70/62* (2013.01); *C08K 7/02* (2013.01); *F03C 2/08* (2013.01);
(Continued)

(58) Field of Classification Search
CPC .......... F03C 2/08; F04C 2/1075; F04C 29/00; F05C 2225/02; F05C 2253/04; C08K 7/02; C08L 9/02; C08L 2205/16; B29C 70/62
See application file for complete search history.

(56) References Cited

U.S. PATENT DOCUMENTS

| | | | | |
|---|---|---|---|---|
| 3,556,844 A | * | 1/1971 | Marzocchi | C08J 5/08 428/296.4 |
| 3,746,669 A | * | 7/1973 | Dunnom | C08L 83/04 524/493 |

(Continued)

OTHER PUBLICATIONS

Product Brochure from RheinChemie, Rhenogran P 91-Rhenogran P95, High-tech components for all rubber products subject to heavy-duty dynamic and thermal loads, 5 pages.
(Continued)

*Primary Examiner* — Theresa Trieu
(74) *Attorney, Agent, or Firm* — Zeman-Mullen & Ford, LLP

(57) ABSTRACT

A rubber compound for use in a stator in a positive displacement motor. The rubber compound includes a fiber reinforcement, wherein fibers in the fiber reinforcement create a grain direction in which "with the grain" is generally orthogonal to "across the grain". In some embodiments, the rubber compound has a first value for 25% tensile Modulus across the grain and a second value for 25% tensile Modulus with the grain, wherein the first value is at least 10% lower than the second value. In such embodiments, the fiber reinforcement may further include a fiber loading of greater flan 1.0 phr of fibers. In such embodiments, the rubber compound may further have a 25% tensile Modulus of greater than 400 psi across the grain and a 50% tensile Modulus of greater than 700 psi across the grain.

56 Claims, 13 Drawing Sheets

Related U.S. Application Data

(60) Provisional application No. 62/240,876, filed on Oct. 13, 2015.

(51) Int. Cl.

| | | |
|---|---|---|
| F04C 2/00 | (2006.01) | |
| F04C 29/00 | (2006.01) | |
| B29C 70/62 | (2006.01) | |
| F04C 2/107 | (2006.01) | |
| F03C 2/08 | (2006.01) | |
| C08K 7/02 | (2006.01) | |

(52) U.S. Cl.
CPC ........ *F04C 2/1075* (2013.01); *C08L 2205/16* (2013.01); *F05C 2225/02* (2013.01); *F05C 2253/04* (2013.01)

(56) References Cited

U.S. PATENT DOCUMENTS

| | | |
|---|---|---|
| 4,048,137 A | 9/1977 | Heitmann |
| 4,659,754 A | 4/1987 | Edwards et al. |
| 5,349,020 A | 9/1994 | Okada et al. |
| 5,391,623 A | 2/1995 | Frances |
| 5,610,217 A | 3/1997 | Yarnell et al. |
| 5,750,616 A * | 5/1998 | Shimpuku ................ C08K 7/02 524/496 |
| 6,160,039 A | 12/2000 | Kleinknecht et al. |
| 6,207,723 B1 | 3/2001 | Matsushita et al. |
| 6,358,171 B1 | 3/2002 | Whitfield |
| 6,559,219 B2 | 5/2003 | Tadaki et al. |
| 6,875,144 B2 | 4/2005 | Kinoshita et al. |
| 8,944,789 B2 | 2/2015 | Butuc et al. |
| 9,016,659 B2 | 4/2015 | Huang |
| 9,228,584 B2 | 1/2016 | Akbari et al. |
| 9,353,462 B1 | 5/2016 | Johnson et al. |
| 10,215,176 B2 * | 2/2019 | Cariveau ................ F04C 2/1075 |
| 2011/0034619 A1 | 2/2011 | Schweitzer et al. |
| 2015/0022051 A1 | 1/2015 | Meng et al. |
| 2015/0315372 A1 * | 11/2015 | Feng ..................... C08L 23/16 524/13 |
| 2017/0101990 A1 | 4/2017 | Cariveau et al. |

OTHER PUBLICATIONS

Article from Finite Fiber, Patent Pending Breakthrough in Fiber Reinforcement Technology, Oct. 11, 2016, 3 pages.

Product information sheet from Teijin, Twaron pulp—extra reinforcement, optimal efficiency, 2 pages.

Provisional patent application having U.S. Appl. No. 62/240,876, filed Oct. 13, 2015 (30 pages).

\* cited by examiner

| Property | Soft Rubber Composition Optimized for High Power Output | Hard Rubber Composition Optimized for High Power Output | Rubber Composition Using Fiber with Modulus less than 75GPa |
|---|---|---|---|
| Shore A Hardness | 70-80 | 80-92 | 80-92 |
| 25% Tensile Modulus | 300-700 psi | 500-1000 psi | 400-1000 psi |
| 50% Tensile Modulus | 400-1000 psi | 500-1200 psi | 500-1200 psi |
| 100% Tensile Modulus | 600-1100 psi | 900-2000 psi | 800-2000 psi |
| %Elongation at Break of Base Rubber Compound with no fiber | 300-500% | 250-400% | 250-400% |
| Tear Strength | 250-350 lb/in | 200-350 lb/in | 200-400 lb/in |
| %Elongation at Break of fiber filled Compound | 250-400% | 180-300% | 180-300% |
| Formulation Parameters | Example | Example | Example |
| Polymer | 100 | 100 | 100 |
| Carbon Black | 70 | 90 | 80 |
| Plasticizer | 20 | 20 | 20 |
| Curatives | 6 | 6 | 6 |
| Activators | 12 | 12 | 12 |
| Fiber predispersion (40% fiber by wt) | 5.5 (2.2phr fiber) | 5.5 (2.2phr fiber) | 10.0 (4.0phr PBI fiber) |
| Total | 213.5 | 233.5 | 228.0 |

*FIG. 3*

| Material | Young's Modulus GPa |
|---|---|
| Rubber (small strain) | 0.01-0.1 |
| PTFE (Teflon) | 0.5 |
| Low density polyethylene | 0.2 |
| UHMWPE (such as Dyneena or Spectra) | 0.7 |
| Polypropylene | 1.5-2 |
| Nylon | 2-4 |
| Pine wood (along grain) — PBI fiber 5.9 GPa → | 8.963 |
| Oak wood (along grain) | 11 |
| Aluminum — Polyester fiber 14.0 GPa → | 69 |
| Aramid (Such as Kevlar and Twaron) | 70.5-112.4 |
| Brass and bronze | 100-125 |
| Glass-reinforced plastic (70/30 by weight fibre/matrix, unidirectional, along grain) | 40-45 |
| Carbon fiber (depends on direction and type) | 300-400 |
| Carbon fiber reinforced plastic (70/30 by weight fibre/matrix, unidirectional, along grain) | 181 |
| Steel | 200 |
| Single-walled carbon nanotube | 1,000+ |

*FIG. 4*

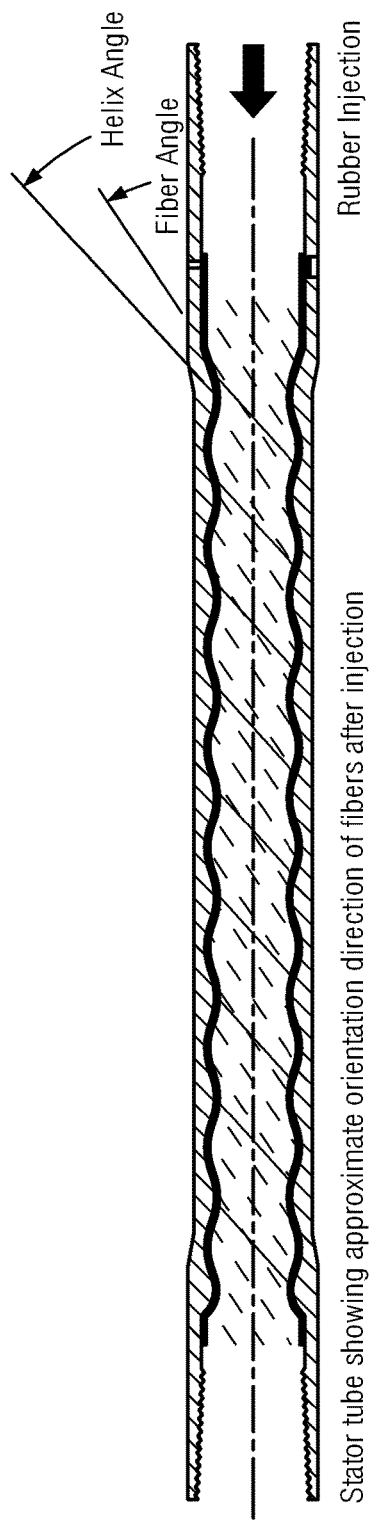
FIG. 7
Stator tube showing approximate orientation direction of fibers after injection
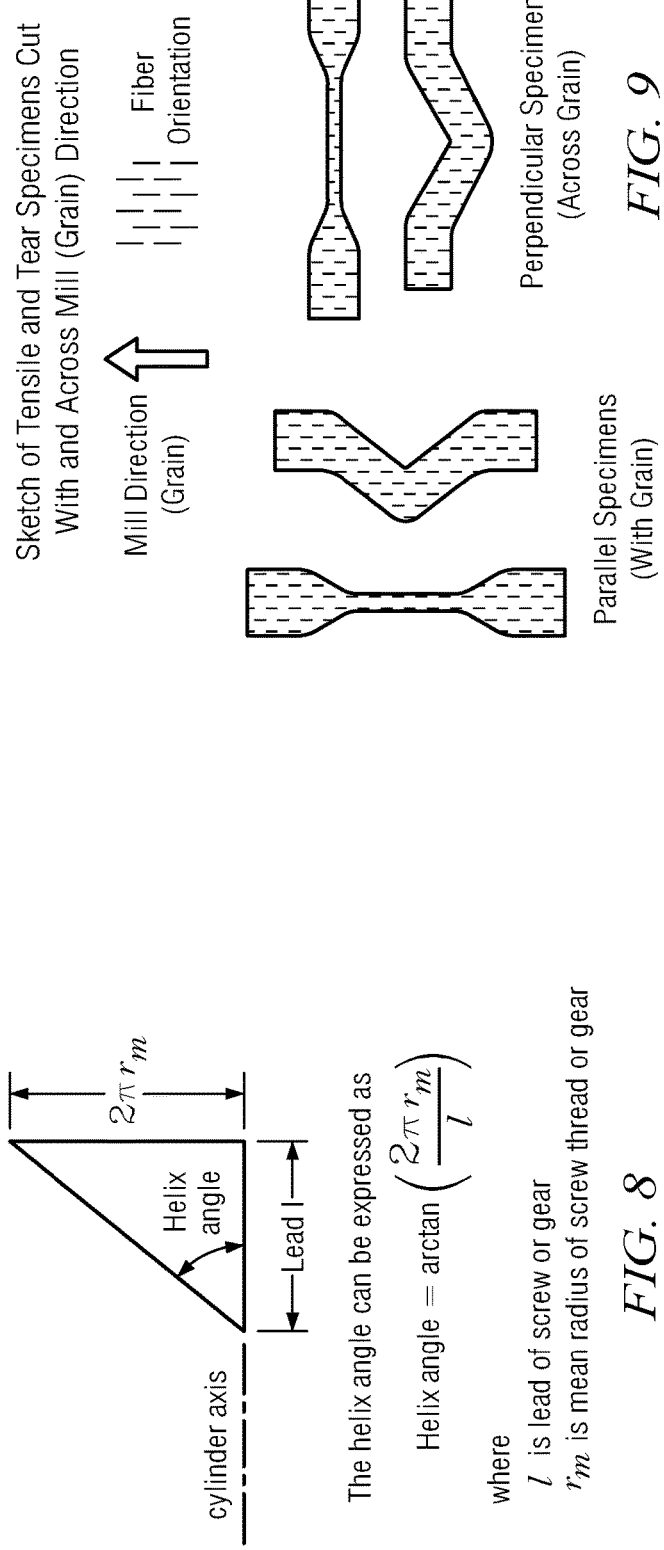
The helix angle can be expressed as
$$\text{Helix angle} = \arctan\left(\frac{2\pi r_m}{l}\right)$$
where
$l$ is lead of screw or gear
$r_m$ is mean radius of screw thread or gear
FIG. 8
Sketch of Tensile and Tear Specimens Cut With and Across Mill (Grain) Direction
FIG. 9

| Property | Soft Rubber Composition for High Solid Bypass | Hard Rubber Composition Optimized for High Power Output | Rubber Composition Using Fibrillated Fiber Mixed with Short Cut Fibers |
|---|---|---|---|
| Shore A Hardness | 70-80 | 84-92 | 84-92 |
| 25% Tensile Modulus | 300-700 psi | 400-800 psi | 700-1000 psi |
| 50% Tensile Modulus | 400-800 psi | 500-1000 psi | 800-1200 psi |
| 100% Tensile Modulus | 500-900 psi | 600-1200 psi | 1000-1600 psi |
| %Elongation at Break of Base Rubber Compound with no fiber | 250-500% | 180-300% | 180-300% |
| Tear Strength | 180-250 lb/in | 200-350 lb/in | 200-400 lb/in |
| Formulation Parameters | Example | Example | Example |
| NBR Elastomer, PHR | 100 | 100 | 100 |
| Carbon Black, PHR | 70 | 90 | 80 |
| Plasticizer, PHR | 20 | 20 | 20 |
| Curatives, PHR | 6 | 6 | 6 |
| Activators, PHR | 12 | 12 | 12 |
| Fiber | 0 | 0 | 1.8-6.0 |

*FIG. 17*

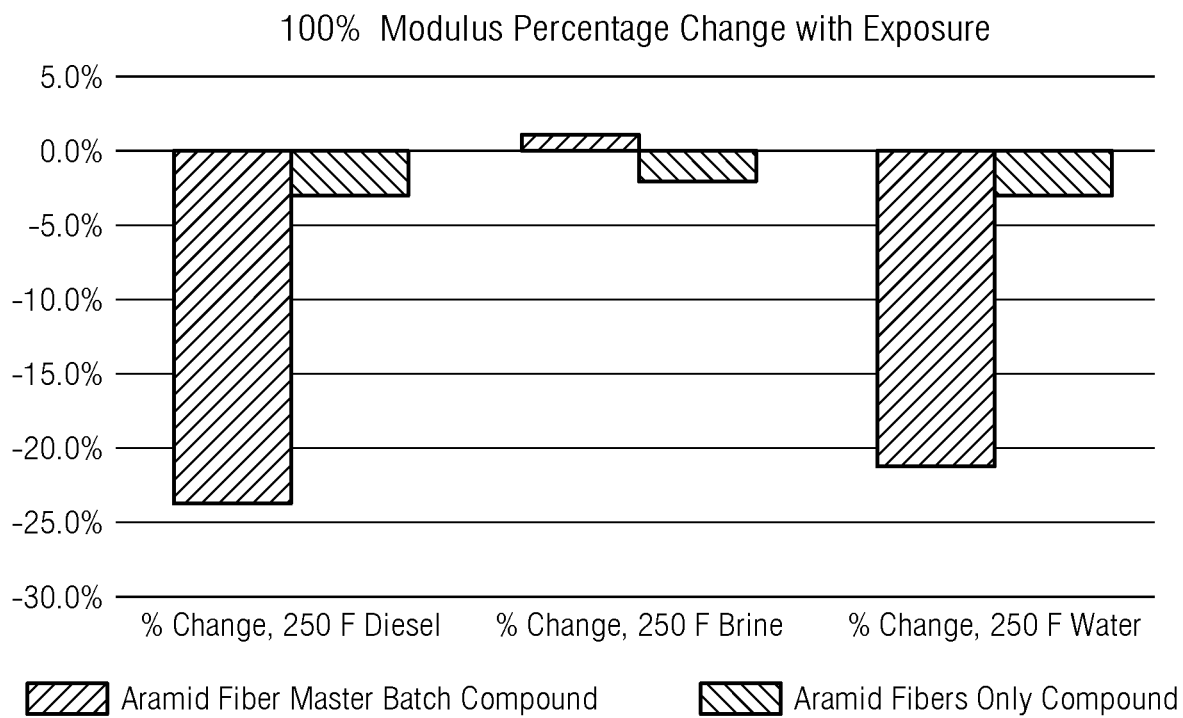

FIG. 20

| | High durometer NBR Compound | High durometer NBR Compound with 6 PHR Aramid Fiber with Mix of fibrillated fibers with short cut fibers |
|---|---|---|
| Duro Hardness, Shore A | 86 | 86 |
| Tensile 25% Modulus with Grain | 523 psi | 938 psi |
| Tensile 100% Modulus with Grain | 1010 psi | 1460 psi |
| Elongation, % at Break with Grain | 238% | 216% |
| Tensile 25% Modulus against Grain | 455 psi | 666 psi |
| Tensile 100% Modulus against the Grain | 935 psi | 940 psi |
| Elongation, % at Break against the Grain | 257% | 249% |

FIG. 21

FIBER-LOADED RUBBER COMPOUND USEFUL IN PDM STATORS

RELATED APPLICATIONS

This application is a continuation application of commonly-invented, commonly-assigned and U.S. nonprovisonal application Ser. No. 15/292,798 filed Oct. 13, 2016. Ser. No. 15/292,798 in turn claims the benefit of, and priority to, commonly-invented and commonly-assigned. U.S. provisional patent application Ser. No. 62/240,876, filed Oct. 13, 2015. The entire disclosures of Ser. No. 15/292,798 and 62/240,876 is incorporated herein by reference.

FIELD OF THE DISCLOSURE

This disclosure is directed generally to fiber reinforcement technology for optimizing the properties of rubber used, for example, in the manufacture of stators in positive displacement motors ("PDMs").

BACKGROUND OF THE DISCLOSED TECHNOLOGY

The fiber reinforcement of rubber technology described in this disclosure optimizes the properties of the rubber, and thus is useful in many industrial or commercial applications. The application of the technology to optimize the properties of rubber used in PDM stators will be used in this disclosure to illustrate one such application.

This disclosure describes a range of optimized fiber-reinforced rubber positions, and methods of making them, for use in the stator injection process. During the rubber injection process to make stators, the rubber is injected though a mold that requires the rubber to flow through a geometry with a very high length to cross section ratio. Typical stator tube geometries may have lengths of 120" to 300" for tube diameters of 4.75" and larger. Stator tubes in the 2" to 4" diameter range have typical lengths of 60" to 150" and stator tubes in the 1.5" to 2" have typical lengths of 50" to 100". As a result of the injection flow process to achieve these geometries, significant grain direction at the rubber molecular level is established in the lobes of the stator. The establishment of a grain in the flow direction is unavoidable, creating undesirable anisotropy in the rubber when cured.

Rubber anisotropy in the stator causes the material properties of the final rubber product to be different in the cylindrically transverse cross-section direction of the stator than in the cylindrical longitudinal direction. In fact, rubber flow during injection is more accurately in a helical pathway flowing in a generally longitudinal direction. Thus the rubber chain molecule grain follows a helical pathway, although performance metrics of the stator look more closely in the cylindrical longitudinal direction and the cylindrical transverse cross-section.

Persons of ordinary skill in this art will understand that, consistent with applicable standards such as ASTM D412, terms such as "Young's Modulus", "Modulus of elasticity", "tensile Modulus", or just "Modulus" (as used in this disclosure) are interchangeable to describe a parameter representing the general propensity of a material to deform (elongate) under a tensile stress load. The value of Modulus for a particular material is generally measured in Pascals, and quantifies the material's propensity to deform under tensile load. The value of Modulus thus predicts an elongation in the material (or a "strain" in the material) for a given tensile stress load. Conversely, the value of Modulus predicts the tensile stress required to be applied to the material to achieve a certain elongation (or "strain"). Thus, by way of example and again consistent with ASTM D412, the term "25% tensile Modulus" or "25% Modulus" as used in this disclosure refers to the tensile stress applied to a material (or seen in a material) at 25% elongation, "50% tensile Modulus" or "50% Modulus" refers to the tensile stress applied or seen at 50% elongation, "100% tensile Modulus" or "100% Modulus" at 100% elongation, and so on. Modulus of elasticity (or simply "Modulus" as used in this disclosure) is one important material performance property of rubber in PDM stators. Modulus is also a somewhat reliable indicator of other desirable material properties, in that higher Modulus will normally indicate higher tensile strength and crack resistance. Without some sort of reinforcement, the rubber anisotropy inevitably caused by injection molding in stator manufacturing causes the cured rubber to exhibit lower Modulus in the cylindrical transverse cross-sectio direction ("against the grain" or "across the grain") versus in the cylindrical longitudinal direction ("with the rain"). LOW Modulus in the transverse direction leads to premature breakdown and "chunking" of the rubber under cyclic operational loads in a PDM.

Elongate fibers introduced into the rubber strengthen the rubber composite, and improve material properties such as crack resistance. When added to rubber, small amounts of fiber can significantly improve the life of components by acting to distribute stress across the component more effectively. This is particularly effective as the component weakens during cyclic loading. Fibers distribute and dissipate energy at the crack tip of any flaw initiation site, thereby slowing the crack initiation and propagation stage of fatigue failures.

Unfortunately, however, elongate fibers within a rubber composite are susceptible to the same grain alignment during manufacture as the underlying rubber chain molecules. Thus conventional fiber-reinforced rubber composites do little to address loss in transverse Modulus, for example, due to the underlying rubber molecule chain anisotropy. The reality is that when elongate fibers are added to the rubber composition, the fibers also tend to align substantially with the grain, i.e. in the flow direction of the helical path of the lobe geometry. The most significant changes in material physical properties enabled by the fibers will be aligned with this helical path and substantially along the length of the stator. In the transverse cross-sectional direction, the material properties will tend to change less. In order to enhance transverse material properties such as transverse Modulus, therefore, it becomes desirable to load the fiber content of the rubber as high as possible, and/or to use high strength fibers as much as possible. However, high fiber load and/or use of high strength fibers may cause other performance issues with the rubber composition, both in chemistry and in material properties. In particular, high fiber load and/or use of high strength fibers is known to reduce flexibility and cracking resistance in some applications, especially at lower temperatures. There has been a longfelt but unsolved need in the PDM stator art for rubber composite products that carry a high fiber load and/or use high strength fibers, and that have also maintained serviceable chemistry or material properties in other aspects.

U.S. Pat. No. 6,358,171 to Whitfield discloses fiber loading of a rubber composite in tension belt applications (such as automotive timing belts). In column 3, line 65 through column 4, line 9, Whitfield posits that the dispersed fibers inhibit crack propagation and growth in the belt rubber during operational loads, thereby improving performance of the belt at both high and low temperatures. Whitfield further discloses that the fibers increase the shear strength of the teeth and thus provide a higher load-carrying capability than a similar belt made without fiber reinforcement.

While instructive on the operational benefits of fiber-reinforced rubber composites generally, Whitfield does not address the anisotropy problem in the PDM stator art identified above, namely achievement of serviceably high Modulus in the transverse cross-section direction ("against the grain') when the manufacturing process necessarily creates substantial fiber alignment in the longitudinal direction ("with the grain"). As can be seen from the Figures in Whitfield, the fibers are aligned in the direction of travel of the belt. Because the belt is retained by pulleys in operation, the belt undergoes comparatively little load in the transverse direction ("against the grain").

The rubber composition disclosed by Whitfield nonetheless forms a serviceable starting point from which to develop a new rubber composition, as disclosed in this application. The modified rubber composition will address the problems in the PDM stator art described above.

U.S. Published Patent Application 2015/0022051 to Meng et al. ("Meng") discloses a fiber-reinforced rubber composite material for use in PDM stators. In paragraph 0008, Meng identifies reasons why the prior art has had difficulty deploying such fiber-reinforced rubber composites in injection molding manufacturing process (such as are generally used in PDM stator manufacturing), and further identifies poor fiber dispersion throughout the composite matrix as a primary culprit. Meng improves dispersion via use of a solid "fiber dispersion compound", such as amorphous silicon dioxide, admixed with the fibers into the rubber. Although Meng confines its disclosed embodiments to use of such a solid fiber dispersion compound, Meng defines "fiber dispersion compound" to include solid agents, liquid agents or a combination of both. Meng discloses use of a fairly wide variety of fibers (see paragraphs 0039-40), and in particular the use of high-strength aramid fibers such as KEVLAR® fibers, in which the chain molecules in the fibers are highly oriented along the fiber axis so the strength of the chemical bond can be exploited.

While Meng's use of a solid dispersion agent may improve dispersion, and thus improve the material properties of the fiber-reinforced rubber compound generally, Meng does not address the problem of anisotropy in PDM stator manufacturing. As a result, Meng estimates a fiber loading for the stator that is too low for optimum performance in the transverse cross-section direction ("against the grain"). As disclosed in paragraph 0062 of Meng, low fiber loading is preferred in Meng's composites in order to render minimal impact on properties other than Modulus.

U.S. Pat. No. 8,944,789 to Butuc et al. ("Butuc") discloses reinforcing a rubber composite with a variety of "reinforcing agents" including fiber. Disclosed embodiments in Butuc use aramid fibers such as KEVLAR® fibers. Butuc also discloses use of a "dispersing substance" that is a carrier for the reinforcing agent. Butuc confines its disclosure to solid dispersing substances that include clay, glass, fumed silica, silicon dioxide, diamond and combinations thereof.

Butuc further discloses use of magnetically-responsive particles to be included with the reinforcing agents and dispersion substances. In FIG. 4C and associated disclosure, Butuc activates a magnetic source through the longitudinal center of the stator during curing of the rubber composite, with the goal of causing the magnetically-responsive particles to align the reinforcement fibers towards the source. As a result, the "grain" in such stators is substantially uniformly in the transverse cross-section direction.

While such magnetically aligned fibers may cause the stator to have improved properties (such as Modulus) in the transverse cross-section direction, Butuc's magnetic method leaves several drawbacks that do not address or remediate the anisotropy problem identified above in this application, at least in any practical way. First, the magnetic alignment method of Butuc simply shifts the anisotropy problem into a different plane. After magnetic processing, there is operational weakness in the stator in the longitudinal direction, which is now "against the grain". Butuc acknowledges as much in column 13, lines 3-14 of its disclosure. Second, the magnetic processing creates an additional manufacturing step which will add to the manufacturing cost of the stator. Third, there is no disclosure in Butuc regarding what effect, if any, the magnetically-responsive particles may have on the material properties of the finished stator. Finally, there is no validation in Butuc (e.g. via disclosed experimentation or examples) that the magnetic alignment process actually produces the transversely-aligned fibers as suggested.

There is therefore a need in the art for a rubber composition for use in, for example, PDM stators, that is engineered to address anisotropy problems caused by the inevitable fiber alignment seen in the longitudinal helical direction when injection molding is used in manufacturing. Advantageously the new rubber composition will use a simple manufacturing solution such as high fiber loading in order to generate serviceable material properties such as high Modulus in the transverse cross-section direction ("against the grain').

While serviceable and highly advantageous in its own right to address anisotropy problems, high fiber loading may enable yet further benefits in some applications when short aramid fibers are used in the high fiber loading.

Generally speaking, highly fibrillated aramid fibers are advantageous in applications where high fiber loading is used to address anisotropy. Highly fibrillated fibers provide increased surface branching, and thus higher fiber surface area. The higher the cumulative fiber surface area, the more fiber reinforcing that becomes available to the mix.

However, more highly fibrillated fibers tend to interlock and, as a result, form fiber clumps and cause more problems with even fiber dispersion and distribution throughout the mix. It is known to extend mixing times to improve fiber dispersion, but extended mix times are also known to increase production cost, add mechanical stress to the finished elastomer, and increase the heat buildup in the batch during mixing. The increased mechanical stress and/or heat buildup leads to adverse effects on the compound during manufacture, such as molecular cleavage and premature scorching.

Another method used to improve fiber dispersion is disclosed in U.S. Pat. No. 8,944,789 to Butuc, as described above. Butuc teaches use of a dispersing substance such as clay, glass, fumed silica, silicon dioxide, or diamond. A disadvantage of using such dispersing substances is that they introduce an extraneous component to the compound that may adversely affect physical properties. For instance, fumed silica and silicon dioxide are known to absorb water and thus increase the tendency of the finished rubber compounds to swell when exposed to water.

Still another method used to improve fiber dispersion is to pre-disperse the fiber in liquid dispersion agents (such those as disclosed in U.S. Published Patent Application 2015/0022051 to Meng et al.). Other methods are known to pre-disperse fiber in a low molecular weight oil and/or elastomer. Such pre-dispersion agents are conventionally mixed as a masterbatch. The masterbatch is then added at selected points through the manufacturing steps of the mix. Attempts to improved distribution of fibers in the mix via pre-dispersion agents thus have the disadvantage of reducing manufacturing economy, since additional masterbatch steps are required. Further, adding the pre-dispersion agent to the rubber compound may adversely affect in-service properties of the final compound, such as retention of mechanical properties at elevated temperatures.

There is therefore also a need in the art for a technique to improve dispersion of highly fibrillated aramid fibers in rubber compounds with high fiber loading Advantageously, such a technique will not rely on known methods to promote dispersion, such as use of solid or liquid dispersion agents in the fiber/rubber mix.

SUMMARY AND TECHNICAL ADVANTAGES

These and other drawbacks in the prior art are addressed by fiber-reinforced rubber composites (and methods of manufacture thereof) that are specifically engineered and optimized to provide the desired material properties. This disclosure describes such optimized rubber composites in accordance with two related inventive aspects: (1) high fiber loaded composites generally; and (2) the use of highly fibrillated aramids blended with short-length, low-fibrillation aramids in such high fiber loaded composites.

In a first aspect (the "First Aspect"), the optimized products maximize the fiber loading to improve crack resistance and fatigue life while still providing a serviceably high Modulus in the transverse cross-section direction ("against the grain") for maximum power output and longevity.

Conventional fibers may be selected for embodiments according to the First Aspect, and are disclosed in U.S. Pat. No. 6,358,171 to Whitfield, for example. The following disclosure is adapted from Whitfield's discussion of conventional fibers.

The type of fibers that may beneficially be used as a reinforcement of the stator elastomer include meta-aramids, para-aramids, polyester, polyamide, cotton, rayon and glass, as well as combinations of two or more of the foregoing, but is preferably para-aramid. The fibers may be fibrillated or pulped, as is well known in the art, where possible for a given fiber type, to increase their surface area, or they may be chopped or in the form of a staple fiber, as is similarly well known in the art. For purposes of the present disclosure, the terms "fibrillated" and "pulped" shall be used interchangeably to indicate this known characteristic, and the terms, "chopped" or "staple" will be used interchangeably to indicate the distinct, known characteristic. The fibers preferably have a length from about 0.1 to about 10 mm. The fibers may optionally be treated as desired based in part on the fiber type to improve their adhesion to the elastomer. An example of a fiber treatment is any suitable Resorcinol Formaldehyde Latex (RFL).

In embodiments in which the fibers are of the staple or chopped variety, the fibers may be formed of a polyimide, rayon or glass, and have an aspect ratio or "L/D" (ratio of fiber length to diameter) preferably equal to 10 or greater. In addition, the fibers preferably have a length from about 0.1 to about 5 mm.

In other embodiments in which the fibers are of the pulped or fibrillated variety, the fibers are preferably formed of para-aramid, and possess a specific surface area of from about 1 $m^2/g$ to about 15 $m^2/g$, more preferably of about 3 $m^2/g$ to about 12 $m^2/g$, most preferably from about 6 $m^2/g$ to about 8 $m^2/g$; and/or an average fiber length of from about 0.1 mm to about 5.0 mm, more preferably of from about 0.3 mm to about 3.5 mm, and most preferably of from about 0.5 mm to about 2.0 mm.

The amount of fiber (and preferably, para-aramid fibrillated fiber) used as reinforcement may beneficially be in a fiber loading from about 1.0 to about 20.0 parts per hundred weight of nitrile rubber (or "phr"); is preferably from about 1.5 to about 10.0 parts per hundred weight of nitrite rubber, more preferably from about 2.0 to about 5.0 parts per hundred weight of nitrile rubber, and is most preferably from about 2.0 to about 4.0 parts per hundred weight of nitrile rubber. One skilled in the relevant art would recognize that at higher fiber loading concentrations, the elastomer would preferably be modified to include additional materials, e.g. plasticizers, to prevent excessive hardness of the cured elastomer or reduced content of carbon black and other filler materials.

The fibers may be added to the elastomer composition via any suitable and/or conventional technique, such as by first incorporating fibrillated fibers in a suitable first elastomer composition to form a fiber-loaded Masterbatch having a final fiber content of about 50% by weight, or any other suitable amount; thereafter adding the fiber loaded master batch to the stator elastomer composition in order to allow for suitable distribution of the fiber in the final stator elastomer composition; and then forming the stator with the thus fiber loaded elastomer composition via any suitable and/or conventional technique.

The nitrite group-containing copolymer rubber composition useful in some embodiments may be cured with sulfur, organic peroxide, or other free-radical promoting material. The elastomeric material may also be cured in a mixed cure system, utilizing a combination of sulfur, an organic peroxide or other free-radical promoting material. In disclosed embodiments, the nitrile group-containing, nitrile copolymer rubber is sulfur cured. Possible sulfur donors for curing include but are not limited to tetra-methyl-thiuram di-sulfide, tetra-ethyl-thiuram di-sulfide, di-pentamethylene thiuram di-sulfide, di-pentamethylene thiuram tetra-sulfide, di-pentamethylene thiuram hexa-sulfide, di-thio-di-morpholine, di-thio-di-caprolactam and 2-(4-morpholinyl di-thio)-benzothiazole. It is believed that if the nitrile rubber is cured with an organic peroxide and reinforced with fiber in accordance with disclosed embodiments, the high temperature resistance of the stator rubber lining would be even higher than a similar sulfur-cured rubber, and would potentially reach peak operating temperatures of 160° to 165° C. or higher.

Other conventional elastomeric additives, process and extender oils, antioxidants, waxes, pigments, plasticizers, softeners and the like may be added, in accordance with conventional rubber processing practice. For example, the elastomeric material may also contains 60-90 phr N774 carbon black, a plasticizer preferably in an amount up to about 20 parts per hundred weight of elastomer, antioxidants, cure accelerators and a cure retarder.

In a second aspect (the "Second Aspect"), embodiments of the disclosed fiber-reinforced rubber composites include manufacturing steps in which highly fibrillated aramid fibers are blended with short-length low-fibrillation fibers in the fiber loading. Preferably, the short-length fibers may be pre-cut from longer low-fibrillation fibers, although this disclosure is not limited in this regard.

The short fibers in the blend help prevent the highly fibrillated fibers from "interlocking" with other fibers, thereby encouraging improved dispersion of the blend throughout the rubber mix. In preferred embodiments, the blend also includes no extraneous components to assist fiber dispersion (such as solid or liquid dispersion agents as used in the prior art) that might adversely affect the properties of the final compound. The presence of the short fibers in the blend also obviates a need for increased mixing times or increased mixing temperatures to aid in fiber dispersion.

Preferably, the short fiber is added by itself directly to the first pass mix of highly fibrillated fiber and rubber in manufacturing a desired rubber compound, although the scope of this disclosure is not limited in this regard. The short fibers in the blend interrupt the tendency of the highly fibrillated fibers to clump and "interlock". The short fibers and highly fibrillated fibers are chemically similar, and so the presence of the short fibers in the blend is not a "foreign substance" (such as a solid or liquid dispersion agent as known in the prior art), and so does not run the risk of negatively affecting the improved mechanical properties provided by the highly fibrillated fibers. In fact, the presence of the short fibers in the blend tends to boost the ability of the highly fibrillated fibers to enhance the material properties of the rubber mix, since the highly fibrillated fibers are distributed more evenly throughout the mix.

Embodiments as described in this disclosure therefore provide a stator for use in a positive displacement motor, the stator comprising: a rubber compound formed into a generally cylindrical rubber stator tube having interior helical pathways therein, the helical pathways extending in a longitudinal direction along the stator tube, the helical pathways providing stator lobes formed in the stator tube in a transverse direction orthogonal to the longitudinal direction; the rubber compound including fiber reinforcement, the fiber reinforcement including a plurality of elongated fibers, the fiber reinforcement having anisotropy in the stator tube, wherein elongated fibers in the fiber reinforcement create a grain direction, the grain direction generally with the grain in the longitudinal direction of the stator tube and across the grain in the transverse direction, in which the rubber compound has a 25% tensile Modulus that is at least a 10% lower tensile Modulus across the grain than with the grain; and the fiber reinforcement including a fiber loading of greater than about 2.5 phr of elongate fibers, the fibers (including elongate fibers) having a 100% tensile Modulus of greater than about 60 GPa, and the rubber compound having a 25% tensile Modulus of greater than about 400 psi across the grain and a 50% tensile Modulus of greater than about 700 psi across the grain.

In other embodiments, the fiber reinforcement includes a fiber loading in a range from about 2.5 phr of elongate fibers to about 10.0 phr of elongate fibers, and more preferably in a range from about 2.5 phr of elongate fibers to about 6.0 phr of elongate fibers.

In other embodiments, the fibers (including elongate fibers) may have a 100% tensile Modulus in a range of about 60 GPa to about 110 GPa, and more preferably in a range of about 60 GPa to about 75 GPa.

In other embodiments, the rubber reinforcement includes fiber reinforcement comprising a blend of fibrillated fibers and short cut (or short chop) fibers in a ratio by weight, and in which: (a) the ratio by weight of fibrillated fibers to short cut (or short chop) fibers in the blend is in a range of about 50:1 to about 3:1; (b) the fibrillated fibers have surface areas in a range of about 2 $m^2/g$ to about 20 $m^2/g$; and (c) the short cut (or short chop) fibers have lengths in a range of about 0.05 mm to about 3.0 mm.

In other embodiments, the rubber compound is manufactured according to a mixing process in which no masterbatch is used and no pre-dispersion agent is added.

In other embodiments, the ratio by weight of fibrillated fibers to short cut (or short chop) fibers in the blend is in a range of about 20:1 to about 4:1.

In other embodiments, which the fibrillated fibers have surface areas in a range of about 7 $m^2/g$ to about 11 $m^2/g$.

In other embodiments, the short cu (or short chop) fibers have lengths in a range of about 0.1 mm to about 2.0 mm.

It is therefore a technical advantage of the disclosed technology according to the First Aspect to create fiber-reinforced rubber compounds for PDM stator applications that include higher fiber loadings than have been seen in the prior art. Such higher fiber loadings take advantage of fiber grain anisotropy in the stator (resulting from the injection process) such that the high fiber loading creates substantial improvement in tensile Modulus in the longitudinal direction (with the grain), with comparatively moderated loss or unchanged performance in elongation in the transverse direction (across the grain). These effects translate into substantial improvement in power capability of the stator, with only moderately changed to unchanged resistance to cyclic fatigue under load from the rotating rotor.

It is a further technical advantage of the disclosed technology to minimize or eliminate the use of silicon dioxide in the composition. Other methods of random chop fiber and pulp fiber additions, rely on the use of spherical silicon dioxide shapes to aid in the dispersion of the fibers within the rubber mixture. In low levels, less than 5 phr (parts per hundred rubber), spherical silicon dioxide can provide beneficial properties such as moisture control and rubber reinforcement. Beyond this amount, silicon dioxide can degrade properties and absorb more moisture than desirable, leading to degraded material performance.

It is a further technical advantage of the disclosed technology to promote the full beneficial properties of aramid fibers as reinforcement for rubber compounds used, for example, in applications such as PDM stators. Conventional thinking suggests that the full potential of aramid fibers cannot be fully achieved without the aid of dispersion agents, and/or without pre-mixing the fiber pulp in a masterbatch, due to the inherent tendency of highly-fibrillated aramids to clump when mixed directly with rubber without such dispersion aids. This disclosure runs counter to such conventional thinking, and in its Second Aspect, seeks to remove low-viscosity substances such as pre-dispersion agents from high-fiber mixes, and further obviate the need for masterbatches. Rubber compounds according the Second Aspect do not contain dispersion agents whose presence in the final product might detract from the elastomeric performance of the rubber compound in service. Fiber blend embodiments according the Second Aspect obviate the need for separate non-fiber dispersion aids such as silica or silicon dioxide (whether in solid or liquid form) Such embodiments further promote manufacturing economy by obviating the need for pre-dispersion steps or a masterbatch, as are common in the prior art. For purposes of this disclosure, a masterbatch is a pre-mixture of elastomer and an active ingredient of formulated compound, such as aramid pulp, that is combined and mixed in a separate step or process prior to being added to a subsequent mixing step of the desired compound. The masterbatch pre-mixes the active ingredient with another component such as a low molecular weight elastomer to promote efficient mixing in subsequent steps of the compounding process. Such ingredients as anti-oxidants, reinforcing agents, and curatives are commonly prepared in masterbatches. The terms masterbatch and pre-dispersion are generally used interchangeably in the art, although a pre-dispersion may sometimes be distinguished to include solid particles instead of a liquid or elastomer.

A further technical advantage of the disclosed technology is that embodiments including blends of highly fibrillated fibers and short-length low-fibrillation fibers facilitate higher loadings of fiber than would otherwise normally be achieved. The blend including short fibers improves overall fiber distribution throughout the mix, thereby enabling mixes with higher fiber loadings to be manufactured more easily and cost-effectively. As discussed in the Background section of this disclosure, reinforced rubber mixes engineered to have higher fiber loadings will tend to show improved crack propagation resistance, increasing fatigue life of the rubber in service. When cracks in stator rubber inevitably form under operational cyclic loads, especially in a transverse direction (across the grain) from compression of lobes via a rotating rotor, higher levels of fiber loading will inhibit the growth of those cracks because a crack is more likely to encounter a fiber in its propagation (the presence of the fiber arresting further growth of the crack). The disclosed blends of highly fibrillated aramids with short-length, low-fibrillation fibers further enable higher fiber loadings than used conventionally. Such higher fiber loadings in turn generate advantageous material properties in the finished rubber compound, such as high Modulus in the transverse cross-section direction ("against the grain") to prevent crack propagation and to improve fatigue life, and even higher Modulus in the longitudinal direction ("with the grain") for increased power. Embodiments of the disclosed technology may also vary the ratios of highly fibrillated fibers to short-length low-fibrillation fibers to achieve more precise desired material properties in the finished compound.

A further technical advantage of embodiments including embodiments including blends of highly fibrillated fibers and short-length low-fibrillation fibers is that shear agents may also be obviated in the mixing process. Limitations with aramid fibers such as Twaron® or KEVLAR® pulp by themselves have been the inability to obtain a consistent mix of the fibers in the bulk materials without either adding more mechanical shear in mixing or using dispersing agent such as silica, or low molecular weight rubbers and oils. Increased shear degrades the rubber compound, and, as noted above in this disclosure, dispersion agents add extraneous components that adversely affect compound properties.

The foregoing has outlined rather broadly some of the features and technical advantages of the disclosed rubber reinforcement technology, in order that the detailed description that follows may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described and as set forth in the appended claims.

BRIEF DESCRIPTION OF THE DRAWINGS

For a more complete understanding of the embodiments described in this disclosure, and their advantages, reference is made to the following detailed description taken in conjunction with the accompanying drawings, in which:

FIGS. 1 through 14 illustrate a First Aspect of the disclosed technology, and FIGS. 15 through 21 illustrate a Second Aspect of the disclosed technology, and in which further:

FIG. 1 illustrates anisotropic material behavior of an injected stator, comparing 2.5 phr fiber loading of rubber to unloaded rubber;

FIG. 2 illustrates elongation at break (expressed as a percentage) of fiber-loaded rubbers by grain direction;

FIG. 3 illustrates optimum material properties for three rubber compositions serviceable in a PDM stator;

FIG. 4 is a reference table: of Modulus of select fibers compared to the corresponding Modulus of other well-known materials;

FIG. 5 illustrates a comparison of Modulus performance between polyester fiber loading and Twaron® fiber loading with the grain;

FIG. 6 illustrates a comparison of Modulus performance between polyester fiber loading and Twaron® fiber loading against the grain;

FIG. 7 depicts a schematic comparison between the fiber alignment angle and the helix angle in a PDM stator after rubber injection;

FIG. 8 depicts a mathematical formula for calculating the helix angle in a PDM stator;

FIG. 9 is a schematic diagram of conventional specimen testing according to grain direction;

FIGS. 10 through 14 depict flow charts illustrating embodiments adding additional dispersion steps to the disclosure of Examples A1 and A2 below;

FIG. 15 illustrates anisotropic material behavior of an injected stator, comparing 4 phr fiber loading of rubber to unloaded rubber, where the fiber loading is according to the Second Aspect disclosed herein;

FIG. 16 depicts elongation change with grain direction in two fiber-loaded rubbers as compared to unloaded rubber;

FIG. 17 depicts currently-preferred optimum properties for rubber compositions in a mud motor, including optimum properties for a composition using fibrillated aramid fiber blended with short cut aramid fibers according to the Second Aspect disclosed herein;

FIGS. 18 and 19 are optical microscope views of fiber dispersion in two comparative samples;

FIG. 20 depicts material properties of comparative rubber compound samples after exposure to diesel, brine and water; and FIG. 21 is a comparison of material properties of a rubber compound made according to Example B1 in this disclosure versus those of a high durometer NBR compound.

DETAILED DESCRIPTION

First Aspect of this Disclosure

Figure 1:
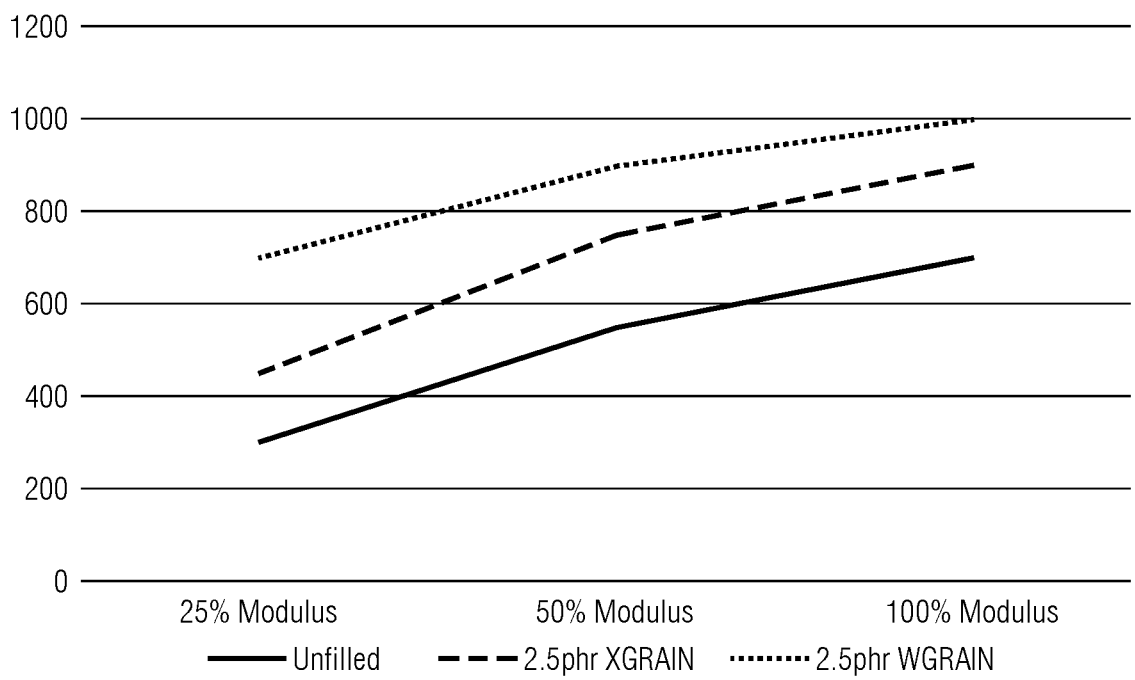

As discussed summarily above in this application, fibers introduced to reinforce a rubber composite will, during injection molding of a PDM stator, align substantially with the flow direction of the helical path of the lobe geometry. The most significant changes in material physical properties will be aligned with this helical path and substantially along the length of the stator in the longitudinal direction). In the transverse cross-section direction, the material properties will change much less. FIG. 1 depicts anisotropic material behavior of an injected stator, comparing 2.5 phr fiber loading of rubber to unloaded rubber. The y-axis units in FIG. 1 are psi. FIG. 1 shows that for a 2.5 phr fiber loading as compared to an unloaded ("unfilled") rubber, the increase in Modulus in the transverse cross-section direction ("XGRAIN", or against the grain) is measurably less than the corresponding increase in the helical/longitudinal direction ("WGRAIN", or with the grain). Further, for 2.5 phr fiber loading, FIG. 1 shows that 25% tensile Modulus is greater than about 400 psi against the grain, and that 50% tensile Modulus is greater than about 700 psi against the grain. FIG. 1 further shows that at 25% tensile Modulus, the value across the grain is depicted at about 450 psi, which is at least 10% lower than the corresponding value with the grain (depicted at about 700 psi). This combination of (1) anisotropic material behavior in stators with high fiber loads, and (2) serviceable tensile Modulus against the grain in such stators notwithstanding the anisotropic material behavior, distinguishes stators according to the First Aspect of this disclosure over conventional stators.

Performance in the transverse cross-section direction is important in a stator, since the performance of a rubber composite in this direction will often define the performance of a PDM. The fit of the rotor within the stator is a primary concern since "fit" dictates power output and durability of the PDM. If the fit is too tight, the elastomer will prematurely fail from heating associated with excessive contact stress and sliding as well as hysteretic flexing of the rubber lobes. If the fit is too loose, the power output will be low and the motor will tend to stall and/or fail from dynamic overloading of the rubber in the lobes.

As can be inferred from the data shown in FIG. 1, due to the anisotropic nature of the final manufactured stator, the stiffness of a rubber compound with greater than 1.5 phr of fiber will have at least 10% lower Modulus in the transverse cross-section direction ("against the grain") than in the longitudinal direction ("with the grain"). For example, FIG. 1 shows that the rubber compound has a 25% tensile Modulus that is more than 10% lower across the grain than with the grain.

Figure 2:
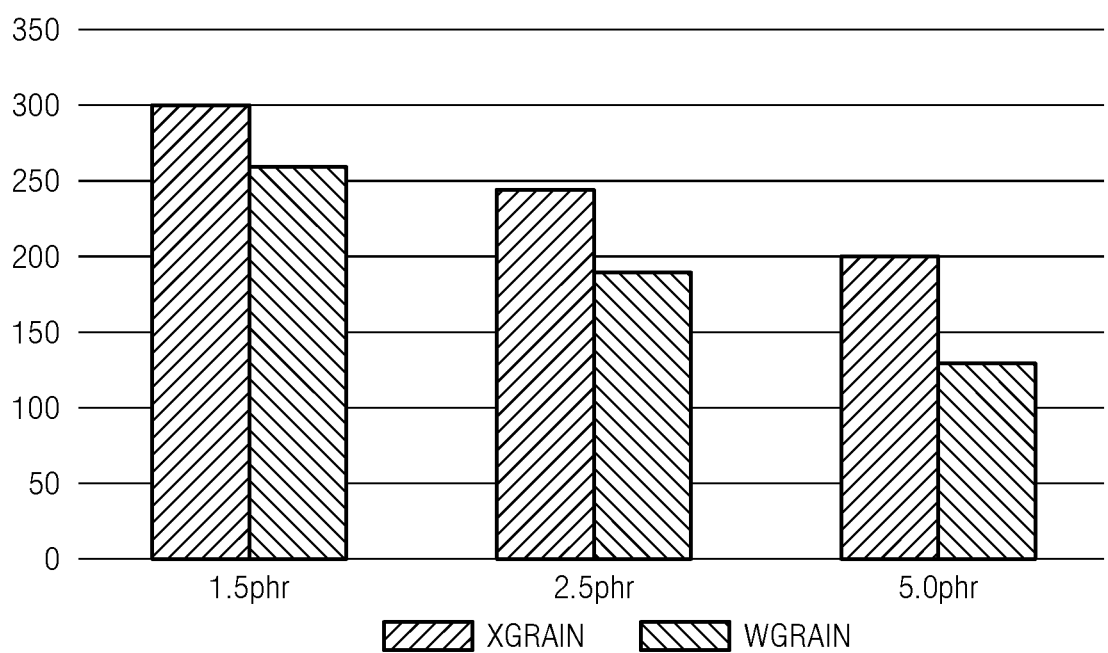

The stator as manufactured, with anisotropy, will also have increased elongation in the transverse cross-section direction. FIG. 2 depicts elongation at break (expressed as a percentage) of fiber-loaded rubbers by grain direction. As shown on FIG. 2, even though the transverse cross-section ("XGRAIN") is known to be less reinforced, the fiber-reinforced rubber composite has much higher elongation in the transverse cross-section direction than prior art testing and disclosure would suggest on material assumed to be isotropic. Prior art disclosures have overlooked the effects of anisotropy, and confined themselves to performing tests on homogenous mixtures of randomly oriented fibers. In fact, the anisotropy imparted by the manufacturing process of a stator allows a higher fiber loading than is suggested in the prior art, enabling in turn an improvement of material properties such as Modulus in the transverse cross-section direction.

As noted earlier in this application, the highest Modulus will be experienced in the longitudinal direction of the stator. In this direction, the high alignment of fibers is acceptable and provides additional wear resistance to the erosive effect of the solid particles found in drilling mud. When aligned longitudinally, the fibers continue to act as a crack arrestor and minimize failures due to chunking of the elastomer. However, high fiber loading will also give serviceably high Modulus in the transverse cross-section direction.

As noted, this application presents a rubber composition with high Modulus and optimum elongation in the transverse cross-section direction in order to maximize the overall performance and durability of the PDM in which the stator is deployed. Material properties of the rubber composite are optimized when they minimize lobe deflection under high load but also deflect far enough to allow solid mud contaminants to pass without damaging the elastomer bond or the rotor surface coating.

FIG. 3 depicts optimum material properties for three rubber compositions serviceable in a PDM stator. This application discloses a fiber-reinforced rubber composite that balances the material properties illustrated in FIG. 3 for three types of optimized composites. Embodiments preferably comprise fiber loading with greater than about 1.5 phr of aramid fibers such as Twaron® or KEVLAR® fibers, with fiber stiffness (100% tensile Modulus) ranging from about 60 GPa to about 110 GPa. Ideal stiffening of the unreinforced rubber occurs in this range. More preferably, embodiments comprise fiber loading in the range of about 1.8 phr to about 5.0 phr using slightly less stiff aramid fibers, with stiffness (100% tensile Modulus) in the range of about 60 GPa to about 75 GPa.

Comparing the high fiber loading in the above embodiments to the prior art discussed in the Background section of this disclosure, the above high fiber embodiments improve significantly the rubber composite's propensity for crack propagation and growth under cyclic operational loads as compared to, for example, the lower fiber loading disclosed in Meng. Looking at Meng in detail, Meng discloses the use of high Modulus aramid fiber in a rubber composition that has an elongation of 300% with a carbon black loading of 90 phr. By contrast, embodiments of the rubber composites disclosed in this application may be loaded with about 2.0 phr to about 3.0 phr fiber when the carbon black loading is dropped to about 75 phr to about 85 phr. This combination of fiber and carbon black loading will still achieve a target elongation of the base elastomer (i.e. without fiber loading) of greater than about 300% for applications specifically designed for high stiffness and high power output, and greater than about 400% elongation for applications specifically designed for handling high solid contents in the drilling mud. These performance criteria are in distinction to Meng's disclosure, which focuses on highly stiff compounds optimized for lower fiber loading. Contrary to Meng, embodiments of the rubber composite disclosed in this application comprise a much higher fiber loading, which is considered to be much more important in improving the fatigue life and high temperature durability of the rubber composite.

Figure 5:
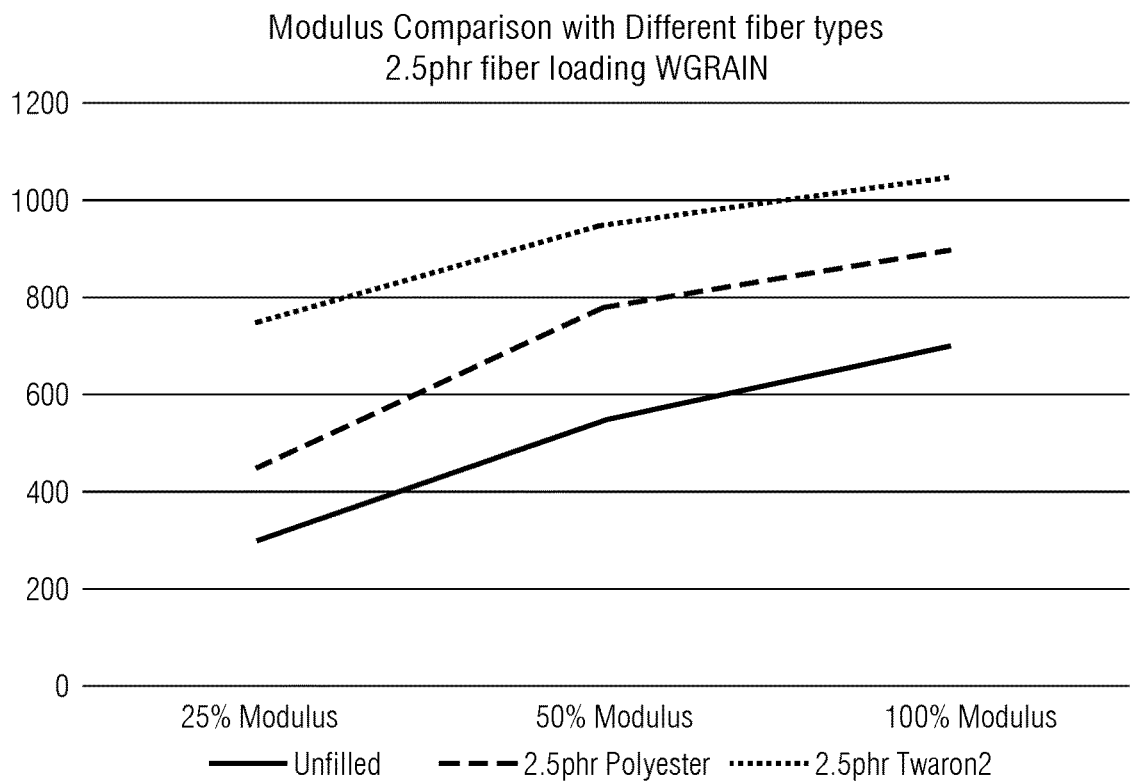
Figure 6:
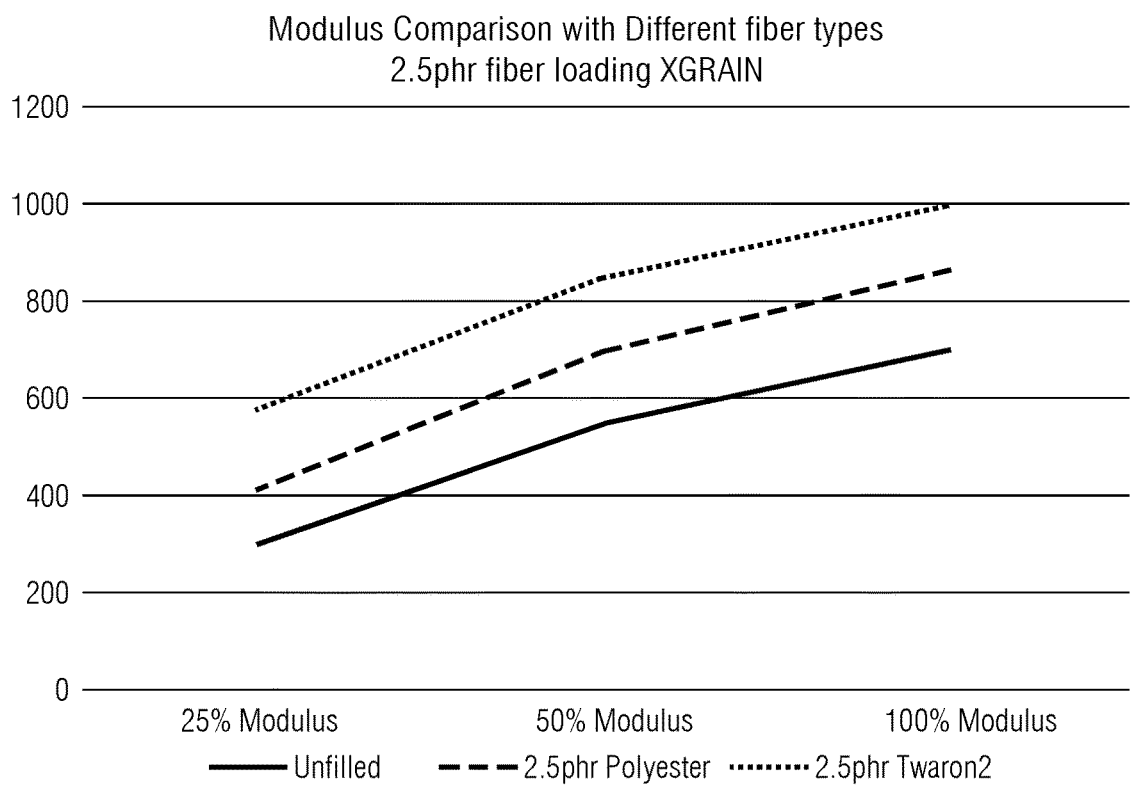

It will be appreciated that embodiments of the high fiber-loaded rubber composites disclosed in this application are not limited to high Modulus aramid fibers such as KEVLAR® and Twaron®. Other embodiments comprise high fiber loading of lower modulus Modulus fibers. FIG. 4 is a reference table of Modulus of select fibers compared to the corresponding Modulus of other well-known materials. It will be understood from FIG. 4 that fibers such as polybenzimidazole ("PBI"), Nylon 66, and polyester can be used at even higher phr loadings due to their lower tensile moduli. For example, polyester has a tensile Modulus of about 14 GPa compared to Twaron®'s 70 GPa (or thereabouts). FIGS. 5 and 6 depict comparisons of Modulus performance between polyester fiber loading and Twaron® fiber loading, with the grain on FIG. 5 and against the grain on FIG. 6. FIGS. 5 and 6 show that at a loading of about 2.5 phr, a rubber composite loaded with polyester will produce an elastomer with a 100% tensile Modulus of about 900 psi with the grain while the same composition reinforced with Twaron® will produce a 100% tensile Modulus of about 1050 psi with the grain.

More specifically, embodiments of high fiber-loaded rubber composites disclosed in this application include rubber composites loaded with lower Modulus fibers greater than about 1.8 phr, and preferably from about 2.0 phr to about 3.0 phr. PBI is also a very good candidate for a reinforcing fiber. With a high melting temperature and low tensile Modulus of about 6.0 GPa, PBI can be used as a reinforcing fiber in very high loading concentrations, offering significant ability to prevent and arrest cracking, and to distribute loads across the entire composite rubber stator.

It was noted earlier in this disclosure that fibers introduced to reinforce a rubber composite will, during injection molding of a PDM stator, align substantially with the flow direction of the helical path of the lobe geometry. It was further noted that the most significant changes in material physical properties will be aligned with this helical path and substantially along the length of the stator (i.e., in the longitudinal direction). Following on from this principle, it will be understood that the orientation of the fiber will not be purely lateral, but will be heavily influenced by the helical angle of the stator lobes. FIG. 7 depicts a schematic comparison between the fiber alignment angle and the helix angle in a PDM stator after rubber injection. FIG. 8 depicts, purely for reference, a mathematical formula for calculating the helix angle in a PDM stator. As illustrated on FIGS. 7 and 8, for most models, when using a standard ASTM tensile sheet to approximate the anisotropy, the angle of maximum anisotropy will be slightly less than the helix angle of the lobe design.

As the injection of rubber flows through the stator old, the path of least resistance occurs in the large cross section of the lobe area in conventionally formed stator tubes. There is a minor amount of cross flow through the thin cross section at the stator valley that works to reduce the fiber and rubber grain alignment with the helix angle of the stator tube but the alignment is found to be substantially along the direction of the helix geometry. When predicting and optimizing the stator rubber material, laboratory tests are needed to measure the material properties. These tests are normally performed in accordance to standardized ASTM rubber test methods. In order to estimate the properties of rubber with fiber alignment, fiber can be mixed into the rubber and then prepared on rubber processing equipment to simulate the injection forces working to align the fiber during the manufacturing process. One method is to use a standard two roll mill and work the rubber in a single direction. The mill will reduce the dimensions of the rubber to a flat sheet. When the flat sheet is retrieved from the mill run, the sheet will be rolled and folded to maintain a single fiber direction. The rubber may be passed through the mill a sufficient number of times in order to establish the desired degree of alignment. This may require five to fifty passes through the mill.

Once the fiber is aligned, it is desirable to test the material properties in critical directions. In the first test, with grain and against grain physical properties are established by orienting the coupons with the rolling direction ("with the grain") and 90° to the rolling direction ("across the grain") to establish the maximum degree of anisotropic behavior for the material. FIG. 9 is a schematic diagram depicting conventional specimen testing according to grain direction. With reference to FIG. 9, when considering the design function of the stator, a second test is needed to determine the physical properties of the stator in the longitudinal and transverse cross section directions. It is the material properties in the transverse cross section direction that are critical in determining the interference fit stresses at the rotor-stator interface of the power section. These properties determine a significant portion of the sealing, friction and hysteretic heating behavior of the design.

When considering PDM stators with more uniform rubber cross section (such as are commonly found in "evenwall" stators), the flow of the rubber is still dictated by the helix angle of the stator mold geometry. However, in some cases, a higher degree of cross flow is seen. In these cases the material properties of the transverse cross section can be better estimated by using an angle that is 5 to 10 degrees less than the helix angle of the stator mold design.

Two examples now follow setting forth recipes and mixing processes that will yield embodiments of the high fiber-loaded reinforced rubber composite disclosed in this application.

EXAMPLE A1

2-Pass Mixing Formulation, Using Commercially Available Fiber With Pre-dispersion in Rubber

| Description | PHR |
|---|---|
| First Pass | |
| NBR | 100 |
| Rhenogran® P91-40/NBR (solid aramid fiber pre-encapsulated in rubber) | 6.25 |
| N774 Carbon Black | 80 |
| Antioxidants | 3 |
| Plasticizers and Processing Aids | 20 |
| Tackifier resin | 6 |
| Stearic acid | 0.5 |
| Zinc Oxide | 3 |
| Second Pass | |
| Sulfur | 1.5 |
| Scorch decelerators | 6.5 |
| Cure accelerators | 1.7 |
| Total Batch Weight | 228.45 |

EXAMPLE A2

2-Step Masterbatch of Twaron® Pulp Fiber Added to First Pass Mixing of Fiber-Filled Compound

| Description | Phr |
|---|---|
| First Step Masterbatch | |
| Cray Valley Ricon® 153 | 100 |
| Twaron® Pulp (native aramid fiber) | 50 |
| Second Step Masterbatch | |
| NBR | 100 |
| First Pass Mixing | |
| NBR | 100 |
| Twaron® Dispersion Masterbatch | 12.5 |
| N774 Carbon Black | 80 |
| Antioxidants | 3 |
| Plasticizers and Processing Aids | 20 |
| Tackifier resin | 6 |
| Stearic acid | 0.5 |
| Zinc Oxide | 3 |
| Second Pass Mixing | |
| Sulfur | 1.5 |

-continued

| Description | Phr |
|---|---|
| Scorch decelerators | 6.5 |
| Cure accelerators | 1.7 |
| Total Compound Batch Weight | 234.7 |

The above two examples are currently preferred embodiments at the time of filing the provisional application to which this application claims priority, although nothing in this disclosure should be construed to limit its scope to these two embodiments. Further, at the time of filing of the provisional application, the recipe of Example A1 was (and still is) preferred of the two disclosed embodiments. However, it will be understood that this preference is solely a matter of design choice based on what is known at the time of filing this application and its predecessor provisional application.

A primary distinction between Examples A1 and A2 is that in Example A1, Rhenogran® P91-40/NBR (or colloquially "Rhenogran 91") is used in making the Masterbatch. As of the date of filing this application, Rhenogran 91 is commercially available from Rhein Chemie Rheinau GmbH in Germany. At least as of its Rhein Chemie Technical Data Sheet dated Dec. 15, 2014, Rhenogran P91 comprises Twaron® aramid fibers (by Teijin Aramid in The Netherlands) in highly fibrillated solid pulp form, where the fibers are coated with NBR already. Rhenogran 91 disperses well in the NBR and other ingredients in the first pass of Example A1.

By contrast, in Example A2, the first stage of the process is a pre-dispersion step, in which native Twaron® aramid pulp fibers are mixed with NBR to create a fibrillated dispersion solid. In effect, this pre-dispersion step in Example A2 is creating a customized, engineered variant of the commercially-available Rhenogran 91.

For the avoidance of doubt, it will be understood that the high fiber-loaded reinforced rubber composites disclosed in this application are not limited to the commercially-available examples of the products used in embodiments described. It will be understood that equivalent substitutions can be made within the scope of the disclosure.

Referring in more detail now first to Example A1, ingredients are mixed in a two-step process using an internal rubber mixer such as a Banbury model or another equivalent model. The internal mixer can be configured with different mixing blades to change the amount of shear force applied to the rubber mix. Blade types are known as two-wing, four-wing and intermesh designs and increase in shear action in the order listed. This mixer type is used in both the first and second pass mixing.

In the first pass mix of the first formula, the NBR polymer is added and sufficiently mixed to raise the temperature to create a flowable mixture. The Rhenogran® P91 fiber dispersion is then added to the mixer. Sufficient time is spent mixing the fiber dispersion into the rubber mixture to establish a well dispersed mixture of fibers. During this part of the procedure, the mixing parameters may be much longer than a normal mixing sequence to distribute the fibers. The carbon black can be added after or before the fiber to also achieve a well distributed mix. Anti-oxidants, resins, process aids, zinc oxide and stearic acid can also be added and mixing continues until sufficient time to distribute the ingredients. The mixture is then deployed onto a roll mill, flattened out, allowed to cool to a solid state, and then cut into sheets for later processing in the second (or subsequent) passes. This sheeted mix is called the rubber formula "Masterbatch".

In a second pass mixing routine, the Masterbatch from the first pass is sized and weighed to fill the mixer with the curative volumes being added. The Masterbatch is mixed to a sufficient towable condition and curatives are added, brought to an optimal temperature for deployment on a roll mill. Once on the roll mill, the compound is flattened, and processed for final sizing and feeding to a strip mill for green rubber preparation and packaging. The green (uncured) rubber is shipped to the stator manufacturing plant for final manufacture of the stator shape on a rubber injection machine.

Referring now to Example A2, the mix procedure is similar to the mix in Example A1 except that the process begins with aramid fiber (such as Twaron®) mixed first into a liquid polymer processing aid such as Ricon 153 by simple blending or stirring and then set aside for use in the internal mixer. The 100 phr of NBR rubber is then mixed in the internal mixer to a flowable condition and the Twaron®/Ricon153 solution is added to the internal mixer and allowed to disperse into the NBR. The mixer is operated a sufficient time to establish and acceptable dispersion of fibers. The mixture is then deployed on a roll mill, and formed into usable Masterbatch sheets of Twaron® Fiber NBR dispersion.

In the second pass of Example A2, the internal mixer is used to bring NBR rubber to a flowable condition and then a portion of Twaron® Fiber NBR Masterbatch is added to the mixer. This is allowed to mix until sufficient fiber dispersion is achieved. After this step, the mixing sequence takes place as disclosed with respect to Example A1.

The following disclosure provides more detail on the mixing processes used in creating compounds with the parameters described above with reference to Examples A1 and A2. In order to disperse small fibers into the stator rubber composition, it is important to start with a first mixing procedure where fiber and an elastomeric mix are combined with a high percentage of fiber. As disclosed above, advantageously the percent fiber volume is in a range of about 15% to about 80% of the mix, and a combination of elastomer and reactant additives accounts for the remaining proportions of the mix. The ideal mixing procedure is a solution mix method that effectively "functionalizes" the fibers with a relatively uniform coating of elastomer. This is best accomplished when fiber volumes fall within the optimum range of about 15% to about 80%.

Solution mixing processes for embodiments set forth in this disclosure are similar to those found in U.S. Pat. No. 5,391,623 to Frances and U.S. Pat. No. 6,160,039 to Kleinknecht. The '623 patent to Frances teaches a solvent mixing procedure where elastomer is dissolved in solvent to make a elastomer rich mixture to which aramid fiber is added. The solvent is then dried while the mixture is continuously agitated.

The '039 patent to Kleinknecht describes a slightly different process where a water based latex solution is used to coat fiber. In this process the fiber is added to a base elastomer composition that may be further reacted to form additional elastomer polymerization. Polymerization additives may be present in the latex solution and are later activated after removal of the water from the solution. During a second solution preparation, the additives are activated to enhance the polymerization sequence. Once final polymerization is complete, the coated fibers are dried to form a chip or whisker shaped pre-dispersion agent ready for mixing into rubber compositions as admix to internal rubber mixers. In addition to these methods, other solution mixing methods may be used to obtain the first masterbatch.

More traditional methods may be used where a blender or mixing device can be used to add liquid polymer such as those offered by the Cray Valley Company under the description of low molecular weight cross-linkable processing aids. As before, mixing may be done in a Banbury internal mixer or similar/equivalent. In the case of direct liquid polymer or process oil additions to fiber (as in Example A2), a blender/mixer similar to a Ross Double Planetary mixer is utilized. Examples of suitable polymer include Ricon 153, Ricon 1731, and Ricon 1754. These liquid polymers can accept similar fiber loading as the previous examples and can act as a pre-dispersion agent. In the case of liquid polymer dispersion, there is no subsequent drying process needed and the dispersion is preferably mixed or blended and immediately added to the internal mixer containing a higher viscosity elastomer carrier r base rubber compound elastomer.

The above procedures describe an "admix" mixing procedure. In this process, the mixing and dispersion of each component can be broken into many pre-dispersion steps that produce what is referred to a masterbatch. Each masterbatch is added to components of the rubber mix in a sequence that maximized dispersion of the small particles or fibers in the desired final mixture of curable rubber preform.

Figure 10:
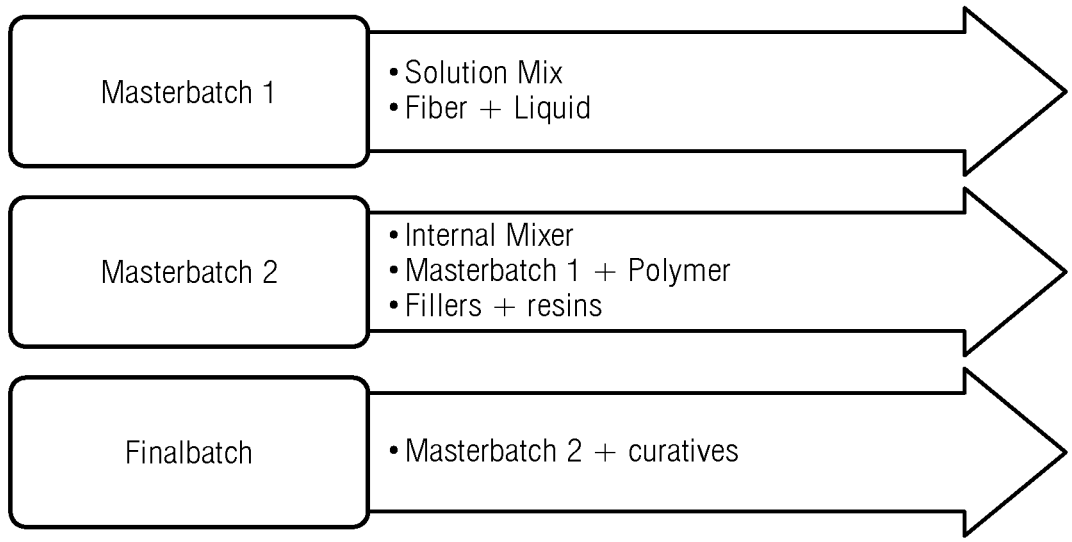
Figure 11:
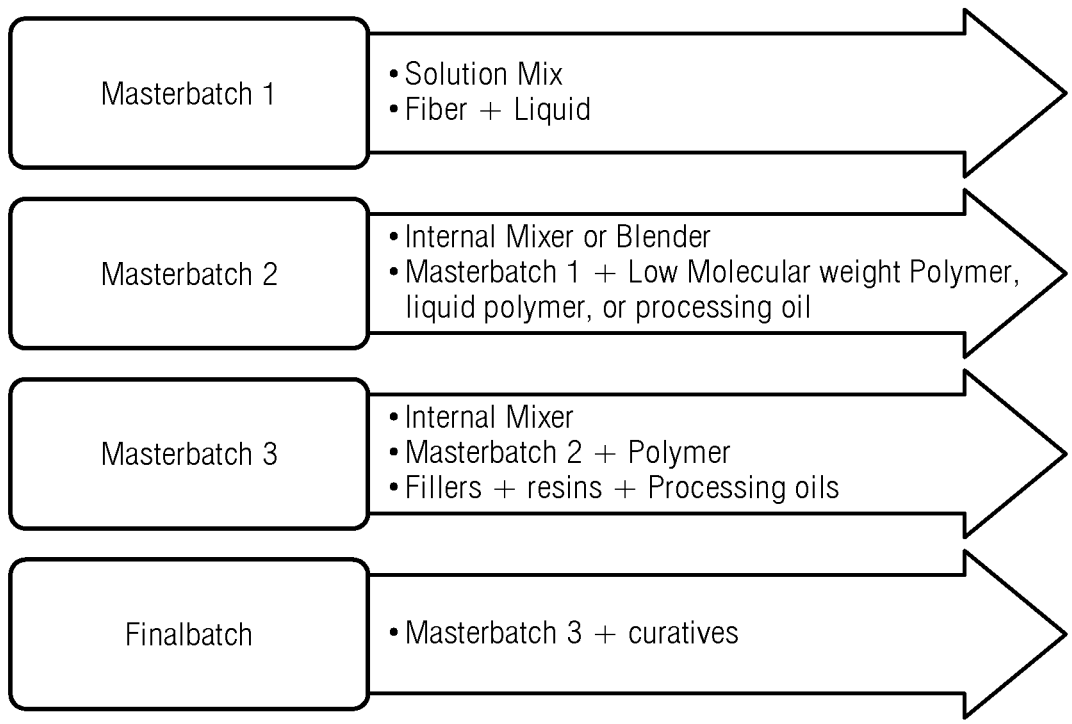
Figure 12:
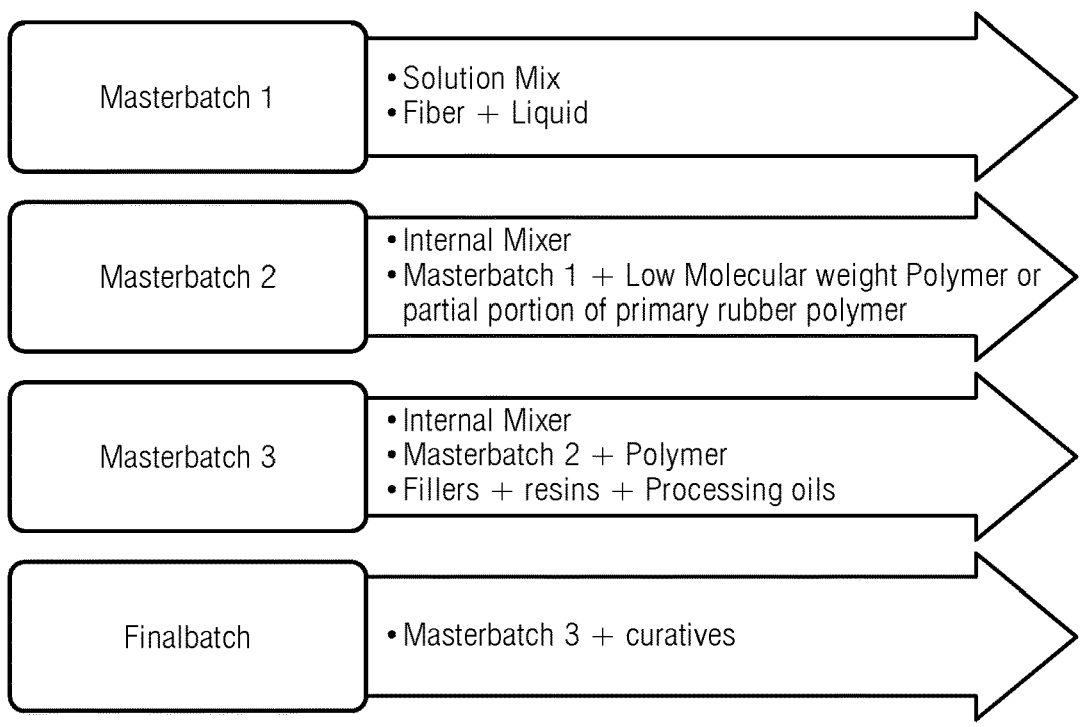
Figure 13:
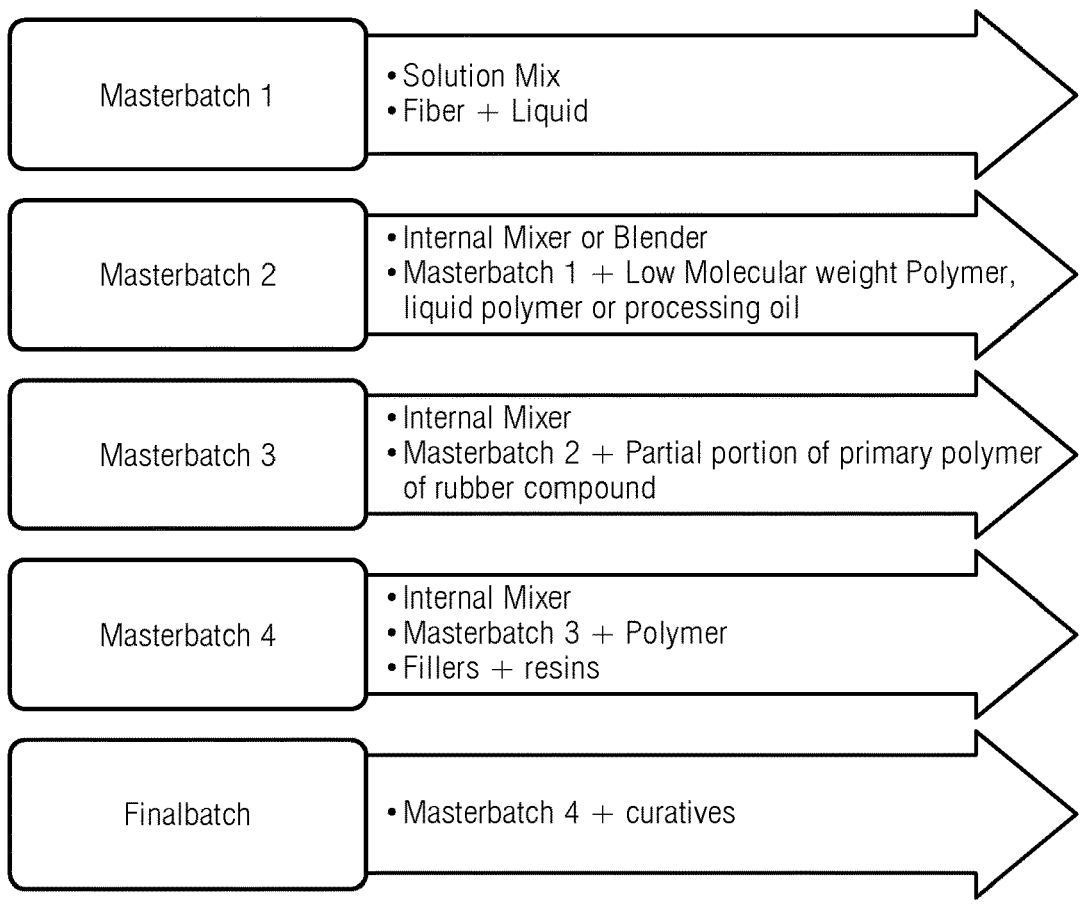
Figure 14:
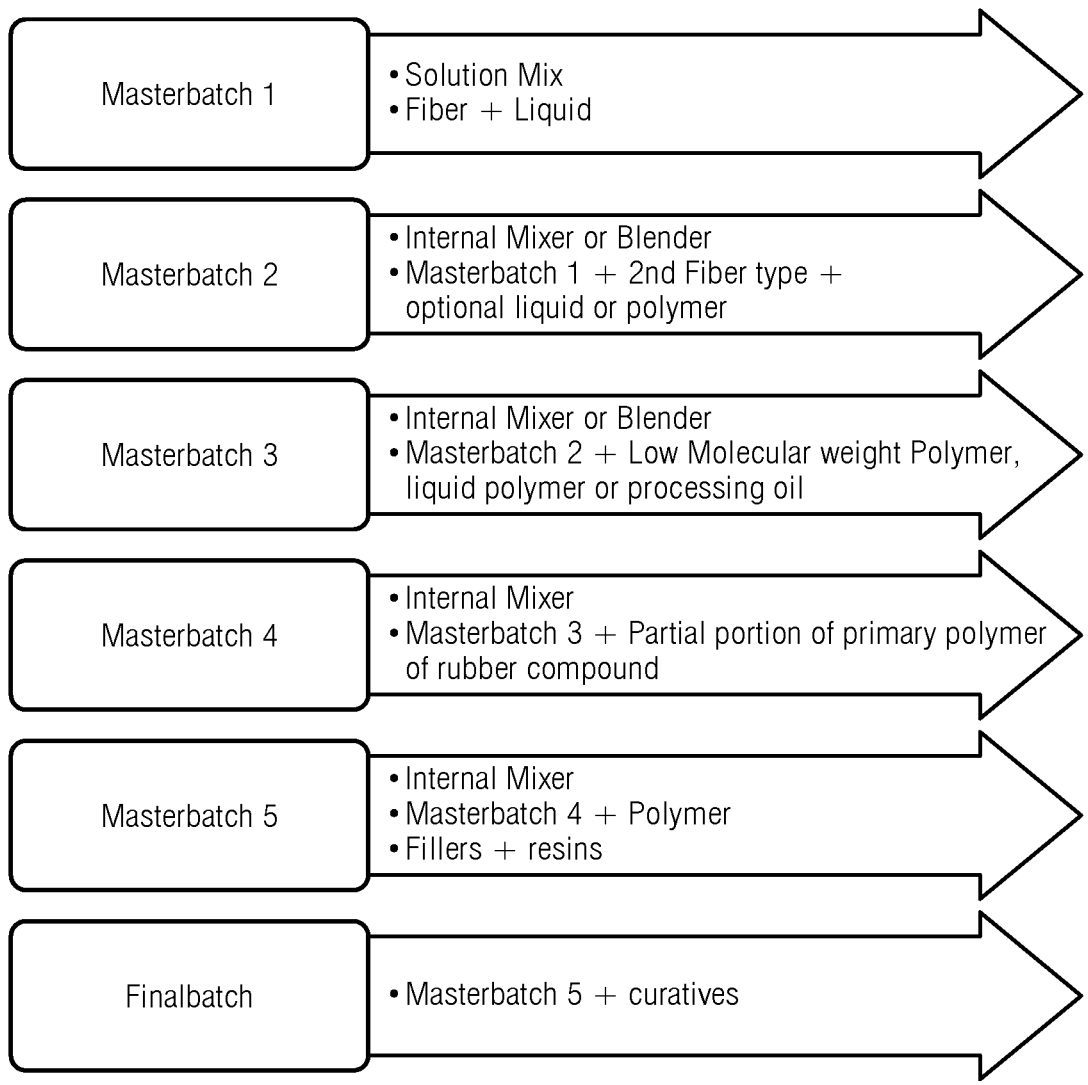

It will be further understood that small fibers used as reinforcement according to the First Aspect may offer resistance to thorough dispersion into rubber mixtures, and so pre-dispersion steps are preferred at the front end of the mixing process. Further embodiments of the high fiber-loaded reinforced rubber composites disclosed in this application may require additional dispersion steps. In some embodiments, three to six mixing steps may be needed order to achieve excellent dispersion of small fibers with high surface area ratio. FIGS. 10 through 14 are flow charts illustrating embodiments adding additional dispersion steps to the disclosure above of Examples A1 and A2. FIGS. 10 through 14 are self-explanatory. FIG. 10 is an exemplary three-step mixing procedure. FIG. 11 is an exemplary four-step mixing procedure including a low viscosity polymer additive in the second step. FIG. 12 is an exemplary four-step mixing procedure including a medium to high viscosity polymer in the second step. FIG. 13 is an exemplary 5-step mixing procedure. FIG. 14 is an exemplary 6-step mixing procedure.

Second Aspect of this Disclosure

Figure 15:
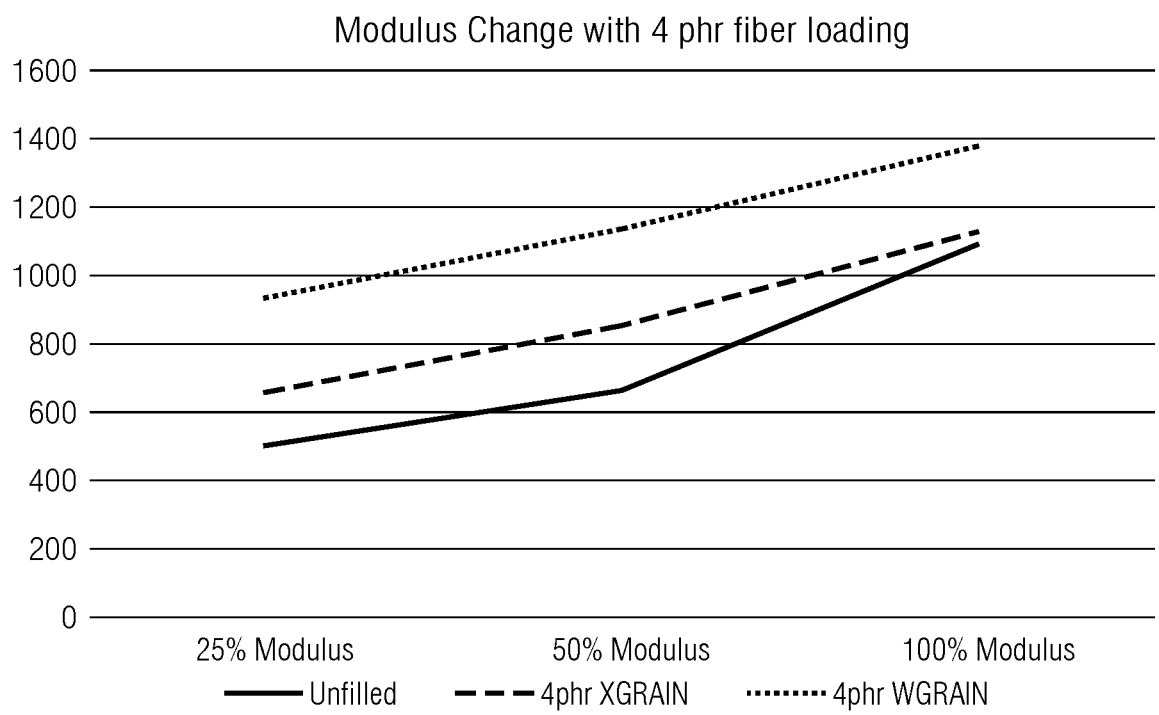

As also discussed above in this disclosure with respect to the First Aspect, fibers introduced to reinforce a rubber composite will, during injection molding of a PDM stator, align substantially with the flow direction of the helical path of the lobe geometry. The most significant changes in material physical properties will be aligned generally with this helical path and substantially along the length of the stator (i.e., in the longitudinal direction). In the transverse cross-section direction, the material properties will change much less. As a result, anisotropy occurs between longitudinal and transverse directions. FIG. 15 is analogous to FIG. 1, discussed above with respect to the First Aspect. However, in contrast to FIG. 1, FIG. 15 depicts Modulus anisotropy in an injected stator, comparing 4 phr fiber loading to unloaded ("unfilled") rubber, where fiber loading comprises aramid fiber blends according to the Second Aspect. FIG. 15 should be viewed with particular reference to the trends shown on FIG. 15 rather than empirical units and absolute values shown on FIG. 15. With reference to FIG. 15, while the fiber loading increases the Modulus (PSI, y-axis) over an unloaded rubber, the increase in Modulus in the transverse cross-section direction ("XGRAIN", or against the grain) is measurably less than the corresponding increase in the helical/longitudinal direction ("WGRAIN", or with the grain). However, the Modulus in the transverse direction ("XGRAIN") is still substantially higher than is exhibited by the base unfilled elastomer.

As described in more detail above, generally in association with FIG. 1, performance in the transverse cross-section direction is important in a stator, since the performance of a rubber composite in this direction will often define the performance of a PDM. As can be inferred from the trends shown in FIG. 15, due to the anisotropic nature of the final manufactured stator, the stiffness of a rubber compound with 4 phr of fiber will have at least 10% lower Modulus in the transverse cross-section direction ("against the grain") than in the longitudinal direction ("with the grain").

Figure 16:
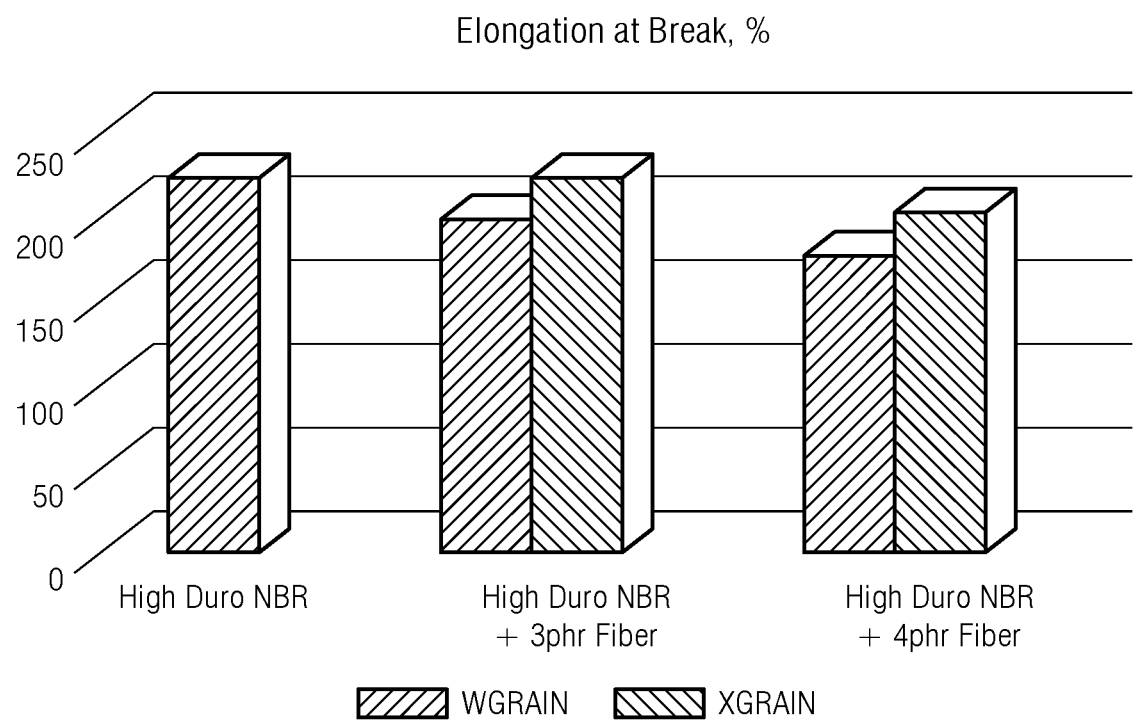

The stator as manufactured, with anisotropy, will also have increased elongation in the transverse cross-section direction as shown below in FIG. 16 (Elongation, % at break, y-axis). FIG. 16 depicts elongation change with grain direction for two fiber-loaded rubbers as compared to unloaded rubber. With reference to FIG. 16, although elongation "with the grain" is less than an unloaded rubber, elongation "against the grain" is similar at 3 phr fiber and 4 phr fiber to the unloaded rubber. FIG. 16 further illustrates that even though the transverse cross-section ("against the grain") is known to be less reinforced than in the longitudinal direction ("with the grain"), the fiber-reinforced rubber composite has much higher elongation in the transverse cross-section direction than prior art testing and disclosure would suggest on material assumed to be isotropic.

As used herein, the terms "fibrillated fiber" and "aramid pulp" are used interchangeably. The terms "fibrillated" and "pulped" are also used interchangeably, as are the terms "cut", "chopped" and "staple".

As discussed summarily above in the Summary section, rubber composites according to the Second Aspect are high fiber loaded, where the fiber is a blend of highly fibrillated fibers and short-length, low-fibrillation ("short cut" or "short chop") fibers. In currently preferred embodiments, the fibers used in the fibrillated fiber short cut fiber blend are aramids. For purposes of this disclosure, a highly fibrillated fiber is a chopped fiber strand whose surface has been mechanically abraded to create micro- or nano-sized fibers attached to the main fiber strand. The fibrillated fiber thus has a very high surface area as compared to an unfibrillated fiber strand. Such fibrillated fiber as a whole takes the form of an aramid pulp. By contrast, short cut fibers are fiber pieces that are cut or chopped down in length from the original fiber strand. Short cut fibers typically have minimal fibrillation. The combination of fibrillated and short cut fibers provide a superior mix of fibers for effectively creating a rubber compound for use in PDM stators without adding extraneous components or ingredients via a masterbatch or pre-dispersion—extraneous components or ingredients that might, as described elsewhere in this disclosure, otherwise compromise the mechanical properties and aging characteristics of the finished rubber compound.

FIG. 17 depicts currently-preferred optimum properties for rubber compositions in a mud motor. Properties are shown for a conventional "soft" rubber, a conventional "hard" rubber, and a composition using fibrillated aramid fiber blended with short cut aramid fibers according to the Second Aspect of this disclosure. As will be seen from FIG.

17, rubber compositions according to the Second Aspect balance the material properties between conventional "hard" and "soft" rubbers.

Currently preferred embodiments of the Second Aspect comprise fiber loading in a range from about 1.5 phr to about 10.0 phr, where the fiber used for loading is the blend of highly fibrillated fibers and short cut fiber, although the scope of this disclosure is not limited in this regard. More preferably, embodiments comprise fiber loading in the range of about 1.8 phr to about 6.0 phr, although again the scope of this disclosure is not limited in this regard.

In currently preferred embodiments according to the Second Aspect, the fibrillated fibers preferably have a surface area from about 2 $m^2/g$ to about 20 $m^2/g$, and more preferably from about 7 $m^2/g$ to about 11 $m^2/g$, although the scope of this disclosure is not limited in this regard. The short chop fibers blended with the fibrillated fibers preferably have a length of about 0.05 mm to about 3.0 mm, and more preferably from about 0.1 mm to about 2.0 mm, although again the scope of this disclosure is not limited in this regard. The ratio of fibrillated fiber to short chop fiber is preferably in a range from about 50:1 to about 3:1 by weight, more preferably from about 20:1 to about 4:1 by weight, although again the scope of this disclosure is not limited in this regard. It will be understood that in particular, the ratio of fibrillated fiber to short chop fiber may be varied per user design to achieve optimal properties for the desired application. The reinforcing fibers may optionally be treated as desired to improve their adhesion to the rubber based in part on the fiber type. An example of a fiber treatment is any suitable Resorcinol Formaldehyde Latex (RFL).

The following Example B1 illustrates a currently preferred recipe for mixing a rubber compound according to the Second Aspect. Example B1 loads the rubber compound with about 4 phr aramid fiber, and uses Varamix®, a commercially available aramid pulp from Finite Fiber, a Dowco, LLC company, based in Akron, Ohio, U.S.A. Varamix® is a pre-mixed blend of highly fibrillated fibers and short chop fibers with a small quantity of antistatic agent added. The precise blend may be specified by the customer according to the manufacturing application for the blend. The Varamix® blend in Example B1 comprises about 84% fibrillated fiber by weight, about 14% short chop fiber by weight, and about 1% antistatic agent by weight. The fibrillated fiber in the blend comprises fibers having surface areas in a range from about 7 $m^2/g$ to about 11 $m^2/g$. The short chop fiber in the blend comprises fibers having lengths in a range from about 0.1 mm to about 2.5 mm.

EXAMPLE B1

First Pass Mixing of Varamix® Directly with NBR, Without Dispersion Agent or Masterbatch

| Description | PHR |
|---|---|
| First Pass - 4 min. Total, Dump below 310 F. | |
| NBR | 100 |
| Varamix ® aramid fiber (mix of long fibrillated fibers with short cut fibers) | 4 |
| N754 Carbon Black | 79 |
| Antioxidants | 3 |
| Plasticizers and Processing Aids | 40 |
| Tackifier resin | 6 |
| Stearic acid | 1 |

| Description | PHR |
|---|---|
| Zinc Oxide | 5 |
| Second Pass - 2 min. Total, Dump below 220 F. | |
| Sulfur | 3 |
| Scorch decelerators | 3 |
| Cure accelerators | 3 |
| Total Batch Weight | 249 |

In Example B1, ingredients were mixed in a two-step process using an internal mixer such as a Banbury or other equivalent model. The internal mixer can be configured with different mixing blades to change the amount of shear force applied to the rubber mix. Tangential mixing blades were used in the recipe above. In the first pass, the polymer and antioxidants were added first and mixed for up to 45 seconds, then a portion of carbon black, all of the fiber, and a portion of plasticizers were added. At periodic intervals over the mixing cycle, the rest of the carbon black, plasticizers, zinc oxide, and stearic acid were added. After about 4 minutes the first pass was dumped at a temperature below 310° F. and placed on a roll mill at about 120° F. For the second pass, the curatives were added, then swept, then dumped after about 2 minutes at a temperature below 220° F. The final dump was then placed on a roll mill at about 120° F. to form into the final strips, FIG. 21 is a comparison of material properties of a rubber compound made according to Example B1 versus those of a high durometer NBR compound. On FIG. 21, the Example B1 compound shows significant improvement in 25% and 100% tensile Modulus in the direction of the grain with only minimalcorresponding change in elongation against the grain, as compared to a high durometer NBR compound. When deployed in a PDM stator, the large increase in Modulus in the longitudinal direction ("with the grain") seen in the Example B1 compound should translate into significant improvement in power output, while the minimal change in elongation against the grain should translate into unchanged resistance to cyclic fatigue under load from the rotating rotor.

Figure 18:
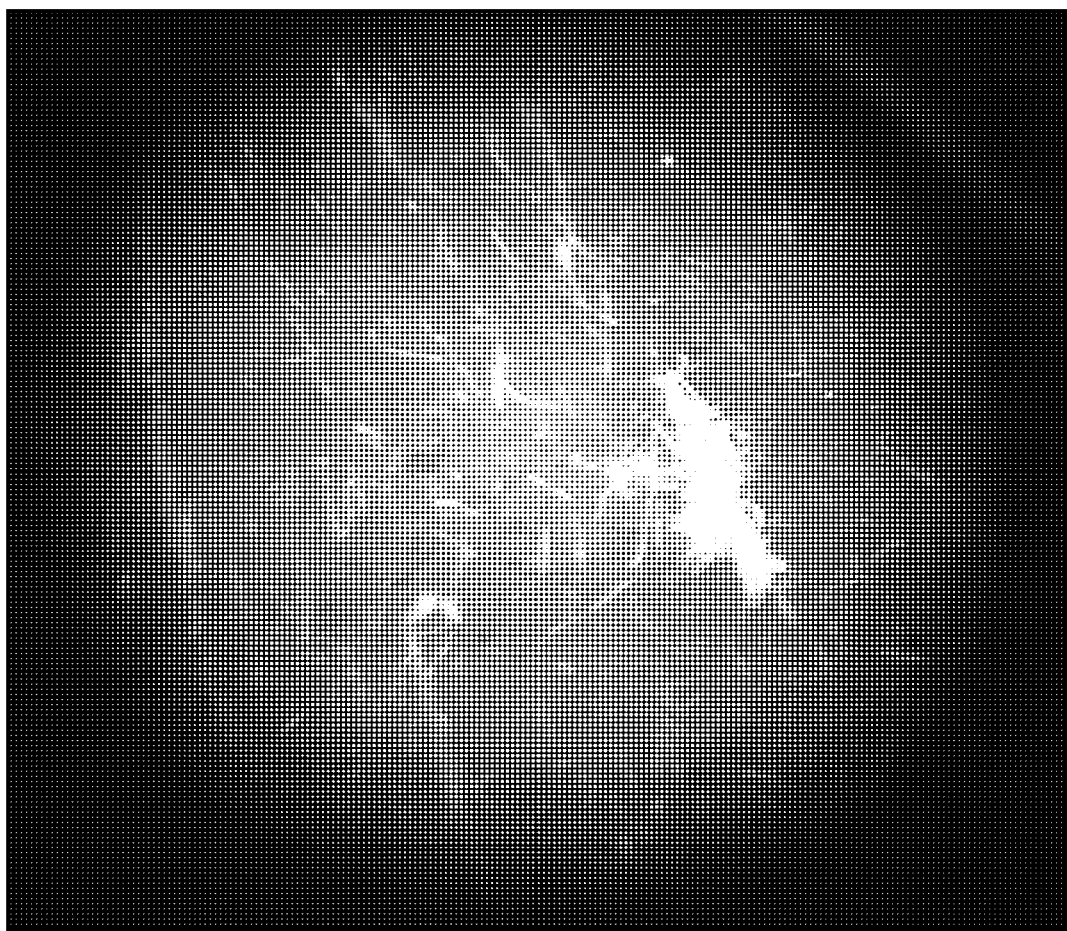
Figure 19:
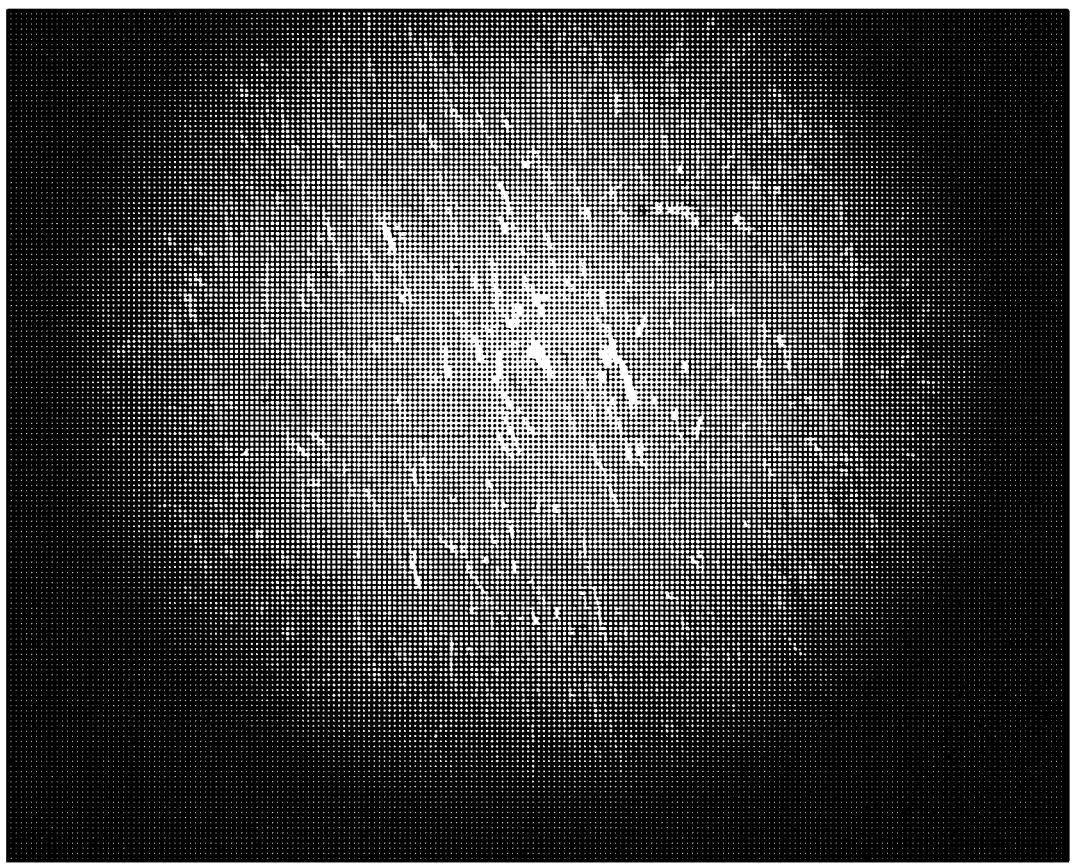

FIGS. 18 and 19 are optical microscope views of fiber dispersion in two comparative samples. Two rubber compounds were prepared in a laboratory scale tangential mixer. The first was prepared with 13 phr of KEVLAR® Merge IF770 aramid in a masterbatch (3 phr effective aramid fiber loading and 10 phr NBR elastomer and other ingredients). The second was made according to the Second Aspect disclosed herein, without a masterbatch or any pre-dispersion agents, and comprised 2 phr of Varamix® per disclosure above. Both compounds were prepared for microscope analysis by cutting a very thin sample, FIG. 18 shows the KEVLAR® compound under an AmScope optical microscope at 10× magnification, and FIG. 19 shows the Varamix® compound under the same microscope at the same magnification. In each of FIGS. 18 and 19, the lighter colored areas are the fibers as found within the respective compounds. In FIG. 18, a large clump of fiber is clearly visible. By contrast, in FIG. 15, the fibers are much more evenly distributed with little or no clumping.

An experiment was also conducted to validate that rubber compositions made according to the Second Aspect disclosed herein, with no extraneous ingredients included to act as dispersion agents (for example), show improved performance when exposed to common downhole environments.

FIG. 20 depicts material properties of comparative rubber compound samples after exposure to diesel, brine and water. Two rubber compounds were prepared in a laboratory scale tangential mixer. The first was prepared with 13 phr of KEVLAR® Merge IF770 aramid in a masterbatch (3 phr effective aramid fiber loading and 10 phr NBR elastomer and other ingredients). The second was made according to the Second Aspect disclosed herein, without a masterbatch or any pre-dispersion agents, and comprised 4 phr of Varamix® per disclosure above. Tensile bars were made of each sample. Some bars were aged in 250° F. diesel, some in 250° F. brine, and some in 250° F. water, all for 72 hours. These environments were selected because most PDM stators are used with diesel-, brine-, or water-based drilling muds at temperatures ranging from 150° F. to 400° F. After aging, the bars were tested for tensile strength per ASTM D412. The results were compared with corresponding sample bars that had undergone no aging.

FIG. 20 shows the results. The sample made with a masterbatch including a dispersion agent displayed over a 20% decrease in 100% tensile 100% Modulus when exposed to diesel or water. By contrast, the "aramid fibers only" compound (made according to the Second Aspect disclosed herein) displayed less than a 5% change in 100% tensile 100% Modulus when exposed to diesel, brine, or water. Changes when exposed to brine were minimal for either sample. The results indicated that the dispersion agent included in the masterbatch sample adversely affected the long term exposure and aging properties of the sample. Such loss of mechanical properties in these environments would cause a large loss in performance with such a masterbatch-based compound deployed in a stator in downhole service. By contrast, a compound made according to the Second Aspect herein should not experience such a loss in performance.

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

We claim:

1. A stator, comprising:
   a rubber compound formed into a stator;
   the rubber compound including a fiber reinforcement, the fiber reinforcement including a plurality of fibers, wherein fibers in the fiber reinforcement create a grain direction in which "with the grain" is generally orthogonal to "across the grain", wherein the rubber compound has a first value for 25% tensile Modulus "across the grain" and a second value for 25% tensile Modulus "with the grain", wherein the first value is at least 10% lower than the second value; and
   the fiber reinforcement including a fiber loading of greater than 1.0 phr of fibers, and the rubber compound having a 25% tensile Modulus of greater than 400 psi "across the grain" and a 50% tensile Modulus of greater than 700 psi "across the grain".

2. The stator of claim 1, in which the fiber reinforcement includes the fiber loading in a range from 1.0 phr of fibers to 20.0 phr of fibers.

3. The stator of claim 1, in which the fiber reinforcement includes the fiber loading in a range from 1.0 phr of fibers to 6.0 phr of fibers.

4. The stator of claim 1, in which the fibers have a Modulus of greater than 60 GPa.

5. The stator of claim 1, in which the fibers have a Modulus in a range of 60 GPa to 110 GPa.

6. The stator of claim 1, in which the fibers have a Modulus in a range of 60 GPa to 75 GPa.

7. The stator of claim 1, in which the fiber reinforcement comprises a blend of fibrillated fibers and short chop fibers in a ratio by weight, and in which:
   (a) the ratio by weight of fibrillated fibers to short chop fibers in the blend is in a range of 50:1 to 3:1;
   (b) the fibrillated fibers have surface areas in a range of 2 $m^2/g$ to 20 $m^2/g$; and
   (c) the short chop fibers have lengths in a range of 0.05 mm to 3.0 mm.

8. The stator of claim 7, in which the ratio by weight of fibrillated fibers to short chop fibers in the blend is in a range of 20:1 to 4:1.

9. The stator of claim 7, in which the fibrillated fibers have surface areas in a range of 7 $m^2/g$ to 11 $m^2/g$.

10. The stator of claim 7, in which the short chop fibers have lengths in a range of 0.1 mm to 2.0 mm.

11. The stator of claim 1, in which the rubber compound is manufactured according to a mixing process in which no masterbatch is used.

12. The stator of claim 1, in which the rubber compound is manufactured according to a mixing process in which no pre-dispersion agent is added.

13. The stator of claim 1, in which the rubber compound is manufactured according to a mixing process in which no masterbatch is used and no pre-dispersion agent is added.

14. The stator of claim 1, in which the fiber reinforcement comprises a blend of at least two fiber types, at least one fiber type in the blend having at least one unique characteristic among other fiber types in the blend wherein said at least one unique characteristic is selected from the group consisting of:
   (a) length;
   (b) surface area;
   (c) chemistry; and
   (d) Modulus.

15. A stator, comprising:
   a rubber compound formed into a stator;
   the rubber compound including a fiber reinforcement, the fiber reinforcement including a plurality of fibers, wherein fibers in the fiber reinforcement create a grain direction in which "with the grain" is generally orthogonal to "across the grain", wherein the rubber compound has a first value for 25% tensile Modulus "across the grain" and a second value for 25% tensile Modulus "with the grain", wherein the first value is at least 10% lower than the second value; and
   the fiber reinforcement including a fiber loading of greater than 1.5 phr of fibers, and the rubber compound having a 25% tensile Modulus of greater than 400 psi "across the grain" and a 50% tensile Modulus of greater than 700 psi "across the grain".

16. The stator of claim 15, in which the fiber reinforcement includes the fiber loading in a range from 1.5 phr of fibers to 10.0 phr of fibers.

17. The stator of claim 15, in which the fiber reinforcement includes the fiber loading in a range from 1.5 phr of fibers to 6.0 phr of fibers.

18. The stator of claim 15, in which the fibers have a Modulus of greater than 60 GPa.

19. The stator of claim 15, in which the fibers have a Modulus in a range of 60 GPa to 110 GPa.

20. The stator of claim 15, in which the fibers have a Modulus in a range of 60 GPa to 75 GPa.

21. The stator of claim 15, in which the fiber reinforcement comprises a blend of fibrillated fibers and short chop fibers in a ratio by weight, and in which:
 (a) the ratio by weight of fibrillated fibers to short chop fibers in the blend is in a range of 50:1 to 3:1;
 (b) the fibrillated fibers have surface areas in a range of 2 $m^2/g$ to 20 $m^2/g$; and
 (c) the short chop fibers have lengths in a range of 0.05 mm to 3.0 mm.

22. The stator of claim 21, in which the ratio by weight of fibrillated fibers to short chop fibers in the blend is in a range of 20:1 to 4:1.

23. The stator of claim 21, in which the fibrillated fibers have surface areas in a range of 7 $m^2/g$ to 11 $m^2/g$.

24. The stator of claim 21, in which the short chop fibers have lengths in a range of 0.1 mm to 2.0 mm.

25. The stator of claim 15, in which the rubber compound is manufactured according to a mixing process in which no masterbatch is used.

26. The stator of claim 15, in which the rubber compound is manufactured according to a mixing process in which no pre-dispersion agent is added.

27. The stator of claim 15, in which the rubber compound is manufactured according to a mixing process in which no masterbatch is used and no pre-dispersion agent is added.

28. The stator of claim 15, in which the fiber reinforcement comprises a blend of at least two fiber types, at least one fiber type in the blend having at least one unique characteristic among other fiber types in the blend wherein said at least one unique characteristic is selected from the group consisting of:
 (a) length;
 (b) surface area;
 (c) chemistry; and
 (d) Modulus.

29. A stator, comprising:
 a rubber compound formed into a stator;
 the rubber compound including a fiber reinforcement, the fiber reinforcement including a plurality of fibers, wherein fibers in the fiber reinforcement create a grain direction in which "with the grain" is generally orthogonal to "across the grain", wherein the rubber compound has a first value for 25% tensile Modulus "across the grain" and a second value for 25% tensile Modulus "with the grain", wherein the first value is at least 10% lower than the second value; and
 the fiber reinforcement including a fiber loading of greater than 2.0 phr of fibers, and the rubber compound having a 25% tensile Modulus of greater than 400 psi "across the grain" and a 50% tensile Modulus of greater than 700 psi "across the grain".

30. The stator of claim 29, in which the fiber reinforcement includes the fiber loading in a range from 2.0 phr of fibers to 5.0 phr of fibers.

31. The stator of claim 29, in which the fiber reinforcement includes the fiber loading in a range from 2.0 phr of fibers to 4.0 phr of fibers.

32. The stator f claim 29, in which the fibers have a Modulus of greater than 60 GPa.

33. The stator of claim 29, in which the fibers have a Modulus in a range of 60 GPa to 110 GPa.

34. The stator of claim 29, in which the fibers have a Modulus in a range of 60 GPa to 75 GPa.

35. The stator of claim 29, in which the fiber reinforcement comprises a blend of fibrillated fibers and short chop fibers in a ratio by weight, and in which:
 (a) the ratio by weight of fibrillated fibers to short chop fibers in the blend is in a range of 50:1 to 3:1;
 (b) the fibrillated fibers have surface areas in a range of 2 $m^2/g$ to 20 $m^2/g$; and
 (c) the short chop fibers have lengths in a range of 0.05 mm to 3.0 mm.

36. The stator of claim 35, in which the ratio by weight of fibrillated fibers to short chop fibers in the blend is in a range of 20:1 to 4:1.

37. The stator of claim 35, in which the fibrillated fibers have surface areas in a range of 7 $m^2/g$ to 11 $m^2/g$.

38. The stator of claim 35, in which the short chop fibers have lengths in a range of 0.1 mm to 2.0 mm.

39. The stator of claim 29, in which the rubber compound is manufactured according to a mixing process in which no masterbatch is used.

40. The stator of claim 29, in which the rubber compound is manufactured according to a mixing process in which no pre-dispersion agent is added.

41. The stator of claim 29, in which the rubber compound is manufactured according a mixing process in which no masterbatch is used and no pre-dispersion agent is added.

42. The stator of claim 29, in which the fiber reinforcement comprises a blend of at least two fiber types, at least one fiber type in the blend having at least one unique characteristic among other fiber types in the blend wherein said at least one unique characteristic is selected from the group consisting of:
 (a) length;
 (b) surface area;
 (c) chemistry; and
 (d) Modulus.

43. A stator, comprising:
 a rubber compound formed into a stator;
 the rubber compound including a fiber reinforcement, the fiber reinforcement including a plurality of fibers, wherein fibers in the fiber reinforcement create a grain direction in which "with the grain" is generally orthogonal to "across the grain", wherein the rubber compound has a first value for 25% tensile Modulus "across the grain" and a second value for 25% tensile Modulus "with the grain", wherein the first value is at least 10% lower than the second value; and
 the fiber reinforcement including a fiber loading of greater than 2.5 phr of fibers, and the rubber compound having a 25% tensile Modulus of greater than 400 psi "across the grain" and a 50% tensile Modulus of greater than 700 psi "across the grain".

44. The stator of claim 43, in which the fiber reinforcement includes the fiber loading in a range from 2.5 phr of fibers to 10.0 phr of fibers.

45. The stator of claim 43, in which the fiber reinforcement includes the fiber loading in a range from 2.5 phr of fibers to 6.0 phr of fibers.

46. The stator of claim 43, in which the fibers have a Modulus of greater than 60 GPa.

47. The stator of claim 43, in which the fibers have a Modulus in a range of 60 GPa to 110 GPa.

48. The stator of claim 43, in which the fibers have a Modulus in a range of 60 GPa to 75 GPa.

49. The stator of claim 43, in which the fiber reinforcement comprises a blend of fibrillated fibers and short chop fibers in a ratio by weight, and in which:
 (a) the ratio by weight of fibrillated fibers to short chop fibers in the blend is in a range of 50:1 to 3:1;
 (b) the fibrillated fibers have surface areas in a range of 2 $m^2/g$ to 20 $m^2/g$; and (c) the short chop fibers have lengths in a range of 0.05 mm to 3.0 mm.

50. The stator of claim 49, in which the ratio by weight of fibrillated fibers to short chop fibers in the blend is in a range of 20:1 to 4:1.

51. The stator of claim 49, in which the fibrillated fibers have surface areas in a range of 7 $m^2/g$ to 11 $m^2/g$.

52. The stator of claim 49, in which the short chop fibers have lengths in a range of 0.1 mm to 2.0 mm.

53. The stator of claim 43, in which the rubber compound is manufactured according to a mixing process in which no masterbatch is used.

54. The stator of claim 43, in which the rubber compound is manufactured according to a mixing process in which no pre-dispersion agent is added.

55. The stator of claim 43, in which the rubber compound is manufactured according to a mixing process in which no masterbatch is used and no pre-dispersion agent is added.

56. The stator of claim 43, in which the fiber reinforcement comprises a blend of at least two fiber types, at least one fiber type in the blend having at least one unique characteristic among other fiber types in the blend wherein said at least one unique characteristic is selected from the group consisting of:
   (a) length;
   (b) surface area;
   (c) chemistry; and
   (d) Modulus.

* * * * *

UNITED STATES PATENT AND TRADEMARK OFFICE
CERTIFICATE OF CORRECTION

PATENT NO. : 11,015,603 B2
APPLICATION NO. : 16/258826
DATED : May 25, 2021
INVENTOR(S) : Cariveau et al.

It is certified that error appears in the above-identified patent and that said Letters Patent is hereby corrected as shown below:

In the Specification

Column 1, Line 32, "positions" should read: -- compositions --.

Column 2, Line 19, "cross-sectio" should read: -- cross-section --.

Column 2, Line 21, "rain" should read: -- grain --.

Column 2, Line 21, "LOW" should read: -- Low --.

Column 5, Line 58, "polyimide" should read: -- polyamide --.

Column 6, Line 9, "nitrite" should read: -- nitrile --.

Column 6, Line 30, "nitrite" should read: -- nitrile --.

Column 8, Line 9, "cu" should read: -- cut --.

Column 10, Line 62, "stator in the longitudinal" should read: -- stator (i.e. in the longitudinal --.

Column 13, Line 30, "old" should read: -- mold --.

Column 16, Line 7, "towable" should read: -- flowable --.

Column 20, Line 35, "minimalcorresponding" should read: -- minimal corresponding --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

In the Claims

Claim 32 at Column 23, Line 59, "stator f claim" should read: -- stator of claim --.

Claim 41 at Column 24, Line 21, "according a" should read: -- according to a --.